United States Patent [19]

Greiner

[11] 4,429,684
[45] Feb. 7, 1984

[54] CHEMICAL HEAT PUMP

[76] Inventor: Leonard Greiner, 2853-A Hickory Pl., Costa Mesa, Calif. 92626

[21] Appl. No.: 320,666

[22] Filed: Nov. 12, 1981

Related U.S. Application Data

[60] Division of Ser. No. 135,726, Mar. 31, 1980, abandoned, which is a continuation-in-part of Ser. No. 842,702, Oct. 17, 1977, abandoned.

[51] Int. Cl.³ ............................................... F24J 3/02
[52] U.S. Cl. .................................. 126/429; 126/430; 126/436; 126/444
[58] Field of Search ............... 126/417, 419, 429, 430, 126/432, 435, 436, 444, 449, 450, 445, 448, 446

[56] References Cited

U.S. PATENT DOCUMENTS

| | | | |
|---|---|---|---|
| 3,902,474 | 9/1975 | Pyle | 126/449 |
| 3,981,294 | 9/1976 | Deminet | 126/445 |
| 4,016,861 | 4/1977 | Taylor | 126/436 |
| 4,019,494 | 4/1977 | Safdari | 126/449 |
| 4,062,352 | 12/1977 | Lesk | 126/444 |
| 4,072,142 | 2/1978 | Lof | 126/449 |
| 4,144,871 | 3/1979 | Porter | 126/449 |
| 4,250,871 | 2/1981 | Milburn | 126/430 |
| 4,257,398 | 3/1981 | Watson | 126/445 |
| 4,301,789 | 11/1981 | Artweger | 126/445 |
| 4,334,524 | 6/1982 | McCullough | 126/449 |

Primary Examiner—Daniel J. O'Connor
Attorney, Agent, or Firm—Hubbard & Stetina

[57] ABSTRACT

A chemical heat pump system is disclosed for use in heating and cooling structures such as residences or commercial buildings. The system is particularly adapted to utilizing solar energy, but also increases the efficiency of other forms of thermal energy when solar energy is not available. When solar energy is not available for relatively short periods of time, the heat storage capacity of the chemical heat pump is utilized to heat the structure, as during nighttime hours. The design also permits home heating from solar energy when the sun is shining. The entire system may be conveniently rooftop located. In order to facilitate installation on existing structures, the absorber and vaporizer portions of the system may each be designed as flat, thin wall, thin pan vessels which materially increase the surface area available for heat transfer. In addition, this thin, flat configuration of the absorber and its thin walled (and therefore relatively flexible) construction permits substantial expansion and contraction of the absorber material during vaporization and absorption without generating voids which would interfere with heat transfer.

1 Claim, 16 Drawing Figures

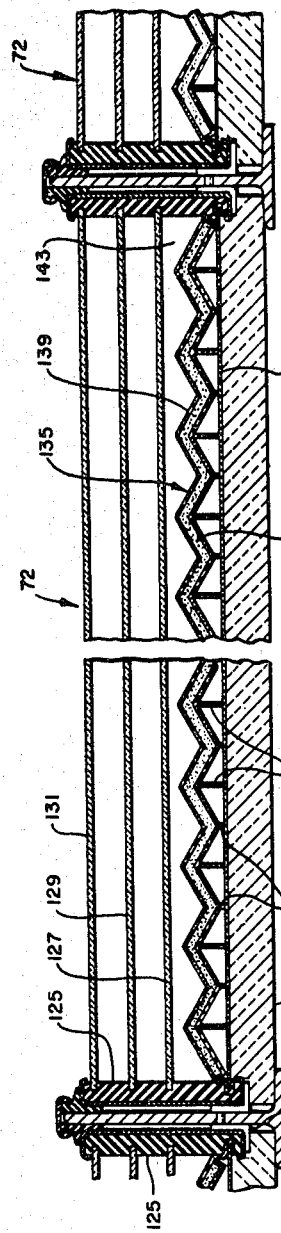
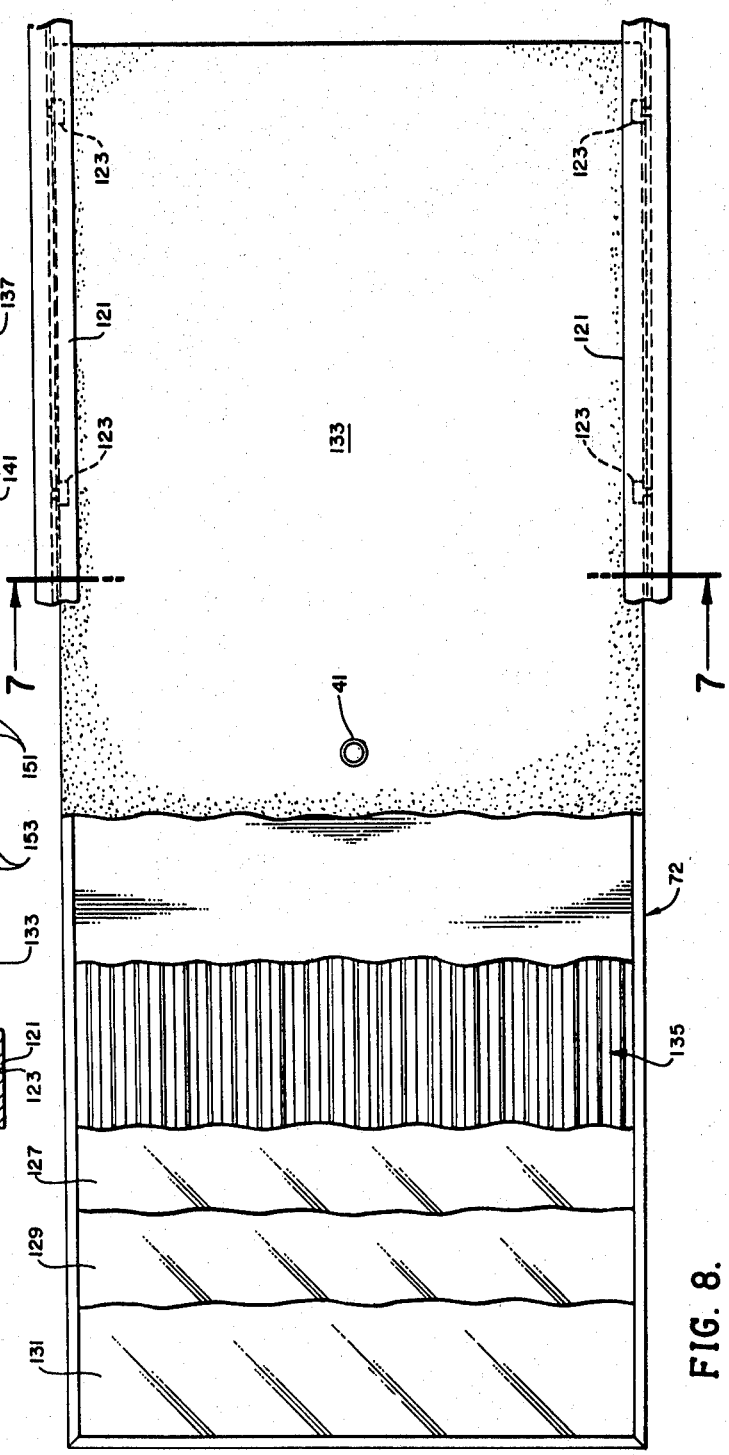
FIG. 7.
FIG. 8.

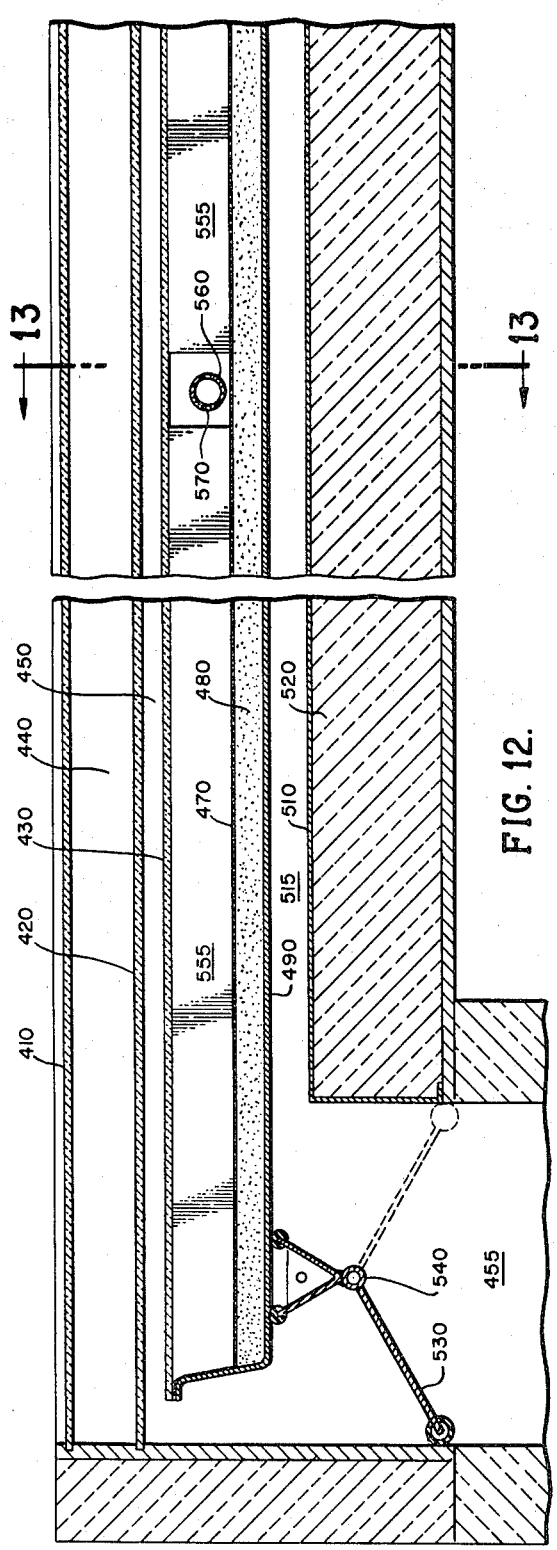
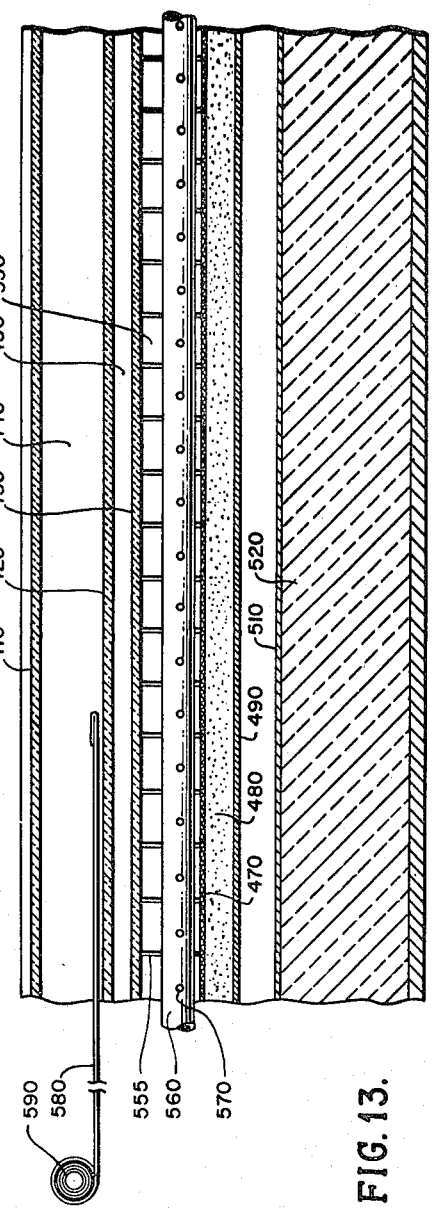
FIG. 12.
FIG. 13.

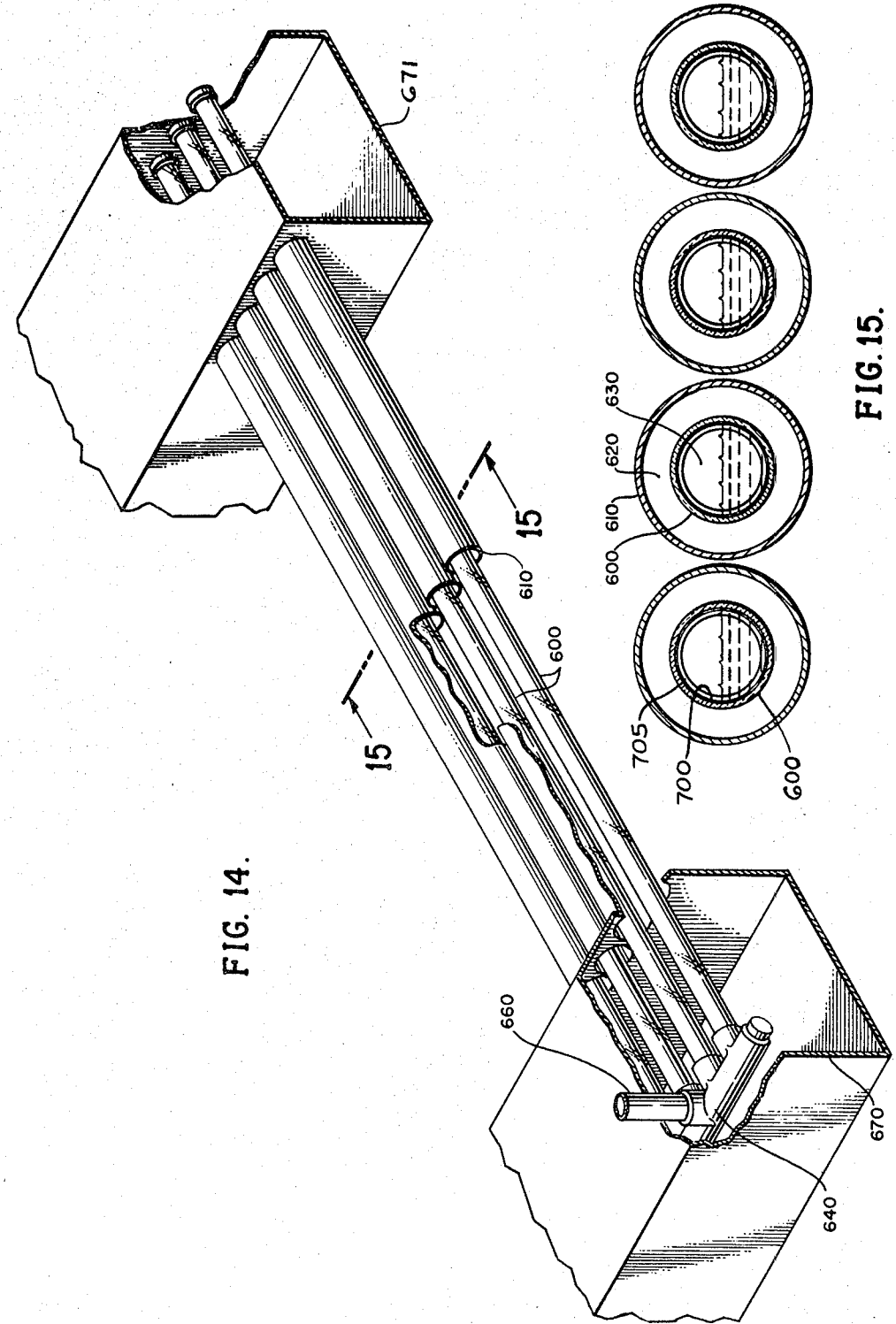

CHEMICAL HEAT PUMP

RELATED APPLICATION

This application is a division of application Ser. No. 135,726, filed Mar. 31, 1980, now abandoned, which is a continuation-in-part of my application of the same title filed Oct. 17, 1977, Ser. No. 842,702, now abandoned.

BACKGROUND OF THE INVENTION

This invention relates to heat pumps and, more particularly, to the use of chemical heat pumps for converting and storing solar energy, making solar energy a practical source for heating and cooling residential or commercial structures. It also relates to the solar collector used with the heat pump.

Absorption refrigeration systems for the purpose of storing thermal energy are known. My prior U.S. Pat. No. 3,642,059, issued Feb. 15, 1972, shows a particularly efficient small-scale absorption system used for refrigeration purposes and also for heating purposes on a stored energy basis. This system has not, however, in the past been designed in the form required for converting and storing solar energy for large-scale space heating or other purposes. In addition, these systems have not been used as combination heat pumps and heat storage systems, which are periodically regenerated to effectively apply cyclically available solar energy for such heating applications. Space heating, of course, requires substantial energy levels to be produced over extended periods of time. In addition, the space heating problem is cyclic, generally occurring on a 24-hour cycle, which requires daily use and may require daily regeneration of the heat pump system.

Prior absorption refrigeration systems have not been designed which would satisfactorily operate to store and convert energy in this environment. One of the more important factors limiting the effectiveness of prior systems based on powdered absorbants has been the fact that, because of the low vapor pressures within the containers generally required for their satisfactory operation, the containers have generally been built as relatively heavy and expensive rigid structures. During absorption and desorption, the vapor-absorbant powder expands and contracts physically. This size change (particularly after numerous cycles of absorption and desorption), tends to lift the chemical from the container walls and to produce voids within the powder bed. Since the container walls are used for the purpose of heat transfer, these resulting evacuated voids between the chemical and the container wall and throughout the powder significantly reduce the effectiveness of the system.

Solar systems in the past, particularly those which use flat plate collectors without concentrators (and especially those in which the flat plate collector is left at a single orientation year around), have suffered from substantial heat losses to the environment, even though one or more layers of transparent material were used to cover the absorbing surface. Normally, in such systems the layers of air between the transparent plates have been static. The static air present between the transparent layers in prior systems has, through convection, conducted heat to the ambient, which significantly reduces the overall efficiency of the solar collection system.

The usual method considered in prior systems of storing solar energy for use during nighttime hours has been either through the sensible heat of water or other material, with satisfactory heat capacity or through the heat of fusion of salts. The prior systems require substantial size and weight, and usually are not feasible for rooftop installation. Prior similar solar systems have not incorporated a heat pump which permits the utilization of heat extracted from the atmosphere to enhance the efficiency of alternate heat sources, such as fossil fuel sources, which must be used during periods of extended cloudiness.

SUMMARY OF THE INVENTION

The present invention alleviates these and many other difficulties inherent in prior art space heating systems by utilizing a chemical heat pump which may be adapted to be roof mounted. The system utilizes, in the preferred embodiment, a combination of water as an evaporating liquid and a solid magnesium chloride hydrate or a lithium chloride hydrate as a water vapor-absorptive chemical. The water and the absorbant are stored in separate containers in a heat-exchange relationship with the space to be heated or cooled, the external atmosphere, or a secondary heat source such as a fossil fuel combustor. The container housing the vapor absorptive chemical is preferably positioned on the rooftop for direct collection of solar energy. The vaporizer container, storing the liquid to be vaporized, is preferably mounted on a rooftop location either in the shade of the absorber or within the roof structure, but, at any rate, out of the direct path of the sun's rays. These two containers are connected to one another by a conduit which permits vapor to pass through during evaporation or desorption in one container while absorption or condensation occurs in the other container during any one of the various operational modes of the system.

The heat exchanger utilizes air ducts connected to air spaces surrounding the containers. These ducts are valved in a manner which permits, through the simple manipulation of a minimum number of control valves or dampers, the operation and regeneration of the system during the various seasons and during daytime and nighttime operation.

The containers housing the vapor absorptive chemical and the liquid to be vaporized are both critical in their construction, since each must be capable of very substantial heat transfer to the heat exchanger air spaces as well as very substantial vapor transfer from one container to another during use and regeneration and each must be made of inexpensive materials. A preferred embodiment of the present invention utilizes thin, large, flat pans for each of these containers, the pans including internal structural support members to support the external atmospheric load on the containers. The vapor absorptive chemical is preferably stored along one surface of the flat absorptive chemical container, this being the surface which is subjected to solar radiation. The chemical may be maintained against this surface by a corrugated or zig-zagged, vapor permeable partition, this zig-zagging substantially increasing the surface area for vapor flow. It has also been found that the surface of the vapor absorptive chemical container subjected to solar radiation may be identically corrugated or zig-zagged, so that the heat transfer surface area, as well as the solar absorption surface area, may be increased. The overall effect of this corrugation has been to substantially increase the heat and vapor transfer characteristics of the system without requiring increased quantities of vapor absorptive chemical. However, in some cases this zig-zag structure is not needed.

In addition, very thin metal is used to form the vapor absorptive chemical container, allowing the walls to flex. Due to the higher pressure outside the container, this flexing tends to prevent voids from forming due to expansion and contraction of the chemical, and assuring substantial, long-term, efficient operation.

The solar-radiation absorbing surface of the vapor absorptive chemical container is preferably separated from the ambient atmosphere by one or more layers of transparent material, such as glass. The space between the container and the first such glass layer forms a part of the heat exchanger mentioned previously, and air used for heat transfer purposes is pumped through this space at a carefully selected velocity. This velocity assures that the air flow remains stable and substantially without eddies. While air flow of this type reduces the effective transfer of heat from the container to the flowing air, this effect is not critical due to the design of the absorber which has a relatively large surface area. Of more importance, it has been found to substantially reduce the heat loss by convection from the chemical container to the atmosphere, thus increasing the overall collector efficiency of the system by utilizing the air flow also required for home heating.

The present invention provides an extremely efficient absorption heat pump for space heating particularly adapted to solar energy wherein the heat pump may be used to both heat and cool the house in the winter and summer months, respectively, and may also be used for reducing the thermal energy input required during fossil fuel or other alternate energy source heating of the structure during very extended sunless periods by utilizing energy from the ambient surroundings to enhance the heat input of such alternate heat source systems.

These and other advantages of the present invention are best understood through the following detailed description of a preferred embodiment which references the drawings, in which:

FIG. 7 is a sectional view of the vapor absorptive chemical tray of the present invention, along with its mounting hardware and transparent cover used for limiting convection losses to the atmosphere ambient;

FIG. 8 is a plan view, partially broken away, showing the various layers in the vapor absorptive chemical solar collector of FIG. 7;

FIG. 12 is a sectional view of an improved embodiment of the absorber panel of FIG. 10 for use with the present invention, the absorber panel of this embodiment forming a more efficient and inexpensive solar collector;

FIG. 13 is a sectional view of the absorber panel of FIG. 12 taken along lines 13—13;

FIG. 14 is a perspective view, partially broken away, of an alternate vaporizer container for use with the present invention, the vaporizer container of this embodiment forming a more durable and inexpensive vaporizer container;

FIG. 15 is a cross-sectional view of the vaporizer container of FIG. 14 taken along lines 15—15.

DETAILED DESCRIPTION OF THE PREFERRED EMBODIMENT

Prior to a description of the system hardware, it is helpful to understand, in detail, the chemical processes which occur in the solar heat pump of the present invention. In this regard, initial attention is drawn to FIG. 1 which is a vapor pressure-temperature illustration for a water-magnesium chloride system, and, in particular, for a water-magnesium chloride tetrahydrate/dihydrate system.

Figure 1:
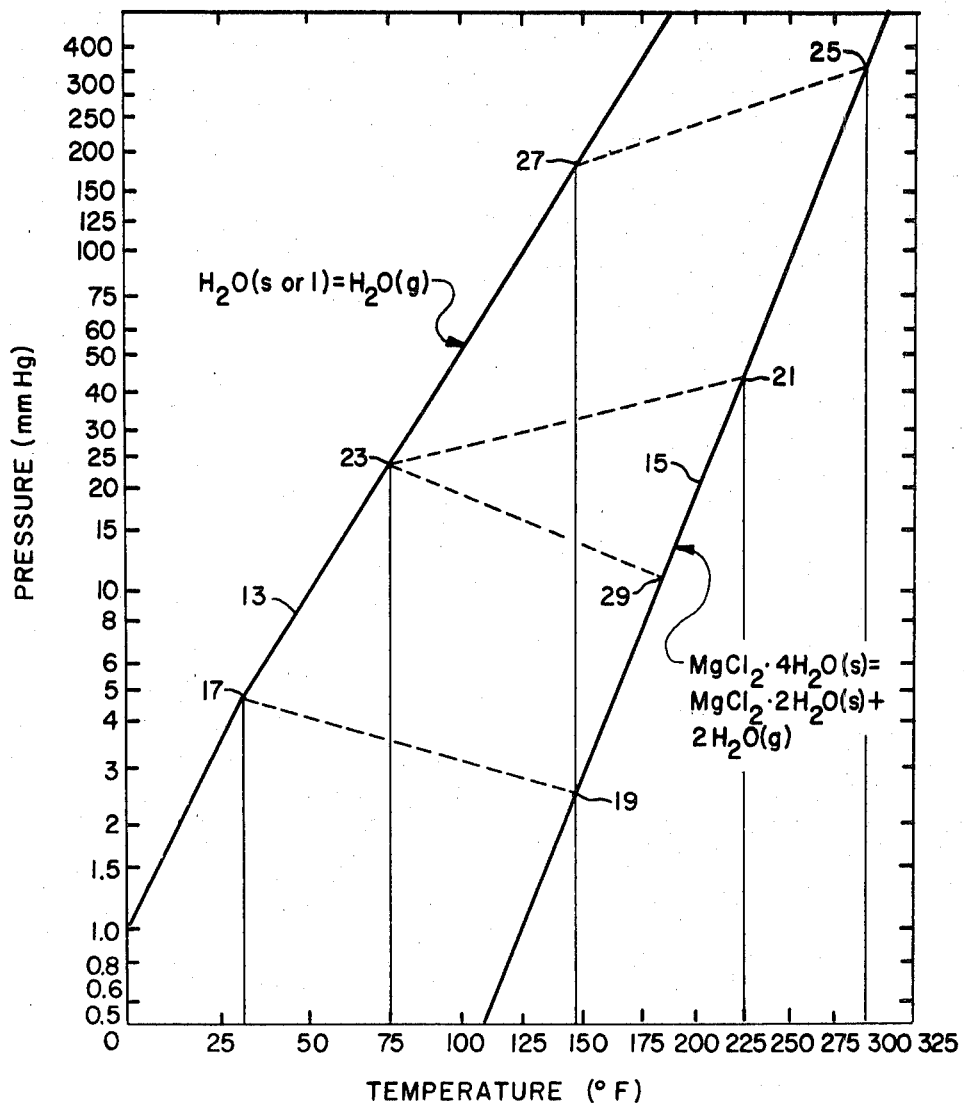
FIG. 1 is a chart illustrating the vapor pressure-temperature relationship for a water-magnesium chloride tetrahydrate system.

In the chemical heat pump, water and the absorptive chemical are stored in separate containers and maintained at different temperatures, with a conduit between the two so that water vapor can flow from one container to the other. This aspect of the operation of the system is identical to that described in my U.S. Pat. No. 3,642,059, which I incorporated herein by reference. Water vapor thus flows between the two containers in response to any vapor pressure differential therebetween. In the diagram of FIG. 1, the line 13 shows the vapor pressure-temperature relationship of water at its transition from a solid or liquid to a gas. The line 15 shows the corresponding vapor pressure-temperature interrelationship for the transition defined by the equation $MgCl_2.4H_2O(s) = MgCl_2.2H_2O(s) + 2H_2O(g)$. It will be seen that the temperature of transition for the solid or liquid water for a given vapor pressure and the temperature for transition of the magnesium chloride hydrate are approximately 150° apart at most pressures. It will likewise be noted that the temperature differential between the materials is approximately 130° when the vapor pressure of water at transition is at a first pressure and the vapor pressure of the magnesium tetrahydrate at transition is at one-half this first pressure.

As previously described, water in solid or liquid form is housed in a first container and magnesium chloride dihydrate is housed in a second container. The following description assures that either of the first and second containers can alternately be connected to the structure to be heated or cooled, or to the outside ambient atmosphere. In addition, the absorptive chemical container may be heated by solar energy or an alternate energy source, such as a fossil fuel.

Cooling or refrigerating the structure while liberating heat to the atmosphere, is accomplished as a two-stage process. In the first stage, the water container, or vaporizer, is maintained, for example, at a point 17 in FIG. 1 where it evaporates and provides cooling by heat transfer between air pumped or blown from the structure to be cooled. As can be seen, the vaporizer container in this example, is at approximately 32° F. and sublimation of the enclosed ice withdraws 21.04 KCal heat of vaporization per gram mole, plus 2.87 KCal heat of fusion, for a total of 23.91 KCal per gram mole. Simultaneously, at point 19, the vapor absorptive chemical container is in a heat transfer relationship with the external environment and liberates heat to the environment at approximately 145° F. It is also in vapor transfer relationship with the vaporizer. The heat liberated at point 19 in the figure is equal to 32.41 KCal heat of absorption, less 0.97 KCal sensible heat to warm the vapor, or 31.44 KCal per gram mole which is dissipated to the environment at 145° F. This heat may be carried to the environment by air pumped around the chemical tray and then exhausted. It will be seen from the figure that point 19 is at a pressure of approximately one-half the pressure at point 17, so that the evaporated vapor self-pumps within the system, leaving the evaporator container at point 17 and being absorbed at the vapor absorptive chemical container at point 19. This two-to-one relationship is chosen as an example, and relationships approaching unity are also satisfactory.

In the second stage of the refrigeration process, the system is regenerated by heating the tetrahydrate to 225° as shown at point 21, utilizing either solar energy directly absorbed by the vapor absorptive chemical container or alternate energy sources such as fossil fuels. The energy required must be sufficient to provide sensible heat of 3.75 KCal per gram mole to warm the tetrahydrate to 225° F., and then 32.41 KCal to desorb the two moles of water vapor at point 21 conditions, for a total of 36.16 KCal per gram mole. The desorbed water vapor spontaneously transfers to the original vaporizer and condenses to liquid at point 23 conditions at 75° F. Here 21.04 KCal heat of vaporization plus 0.60 KCal sensible heat for a total of 21.64 KCal per gram mole is liberated to the surroundings by heat transfer to a flow of ambient air. Further, cooling the original vaporizer to 32° F. to again begin the first stage of the cycle requires about 0.86 KCal plus 0.37 KCal sensible heats for the dihydrate and vapors, respectively, and a further 2.87 KCal to freeze the water for a total of 4.1 KCal. This is taken from the 23.91 KCal cooling provided as previously described at point 17, to leave a final cooling effect of 19.81 KCal per gram mole at 32° F. This results in a coefficient of performance of 0.55 KCal cooling per KCal heat input. As previously mentioned, during sunny days this heat input may be provided by solar radiation. On cloudy days, it may be provided by an alternate energy source, although the latter should not often be required when air conditioning is needed in the structure.

When the system is to be used in a heating mode, the chemical heat pump can significantly increase the effective output of a thermal source by extracting additional heat from the ambient surroundings. Such heating is a two-stage, continuous process. The first stage of heating is identical with the cooling stage. In this case, however, the vaporizer is located in a heat exchange relationship with the external environment which is assumed to be at 32° F. in FIG. 1, or point 17. It withdraws, on vaporization, thermal energy equivalent to the heat of vaporization of the enclosed water from the atmosphere. At the same time, the absorber is at point 19 in FIG. 1 and is located in a heat exchange relationship with the house being warmed where it liberates the heat of vapor absorption at approximately 145° F. During the second heating stage, the original vaporizer is placed in a heat exchange relationship with the area being heated while the original absorber is heated by a thermal source, such as a gas flame or solar energy. The absorber is thereby raised in temperature to approximately 290° at point 25 in FIG. 1 so that the vapor pressure of the enclosed vapor absorptive chemical exceeds the vapor pressure in the vaporizer container when it is at a temperature, as needed for warming, such as the temperature 145° F. at point 27 of FIG. 1. Thus, during this second stage of the heating cycle, vapors desorb from the original vapor absorptive chemical and move through the vapor conduit to the original vaporizer container, and there condense to liberate heat of condensation at a temperature required for heating.

During this heating cycle, the vapor pressure ratio between the absorber and vaporizer containers during each operating mode is maintained at approximately 2 to assure adequate vapor flow. This same ratio will be noted in the case of the refrigeration cycle but, as indicated previously, ratios approaching unity are also satisfactory. Beginning at point 17, 21.04 plus 2.87 KCal thermal energy is removed from the surroundings by sublimation of ice at 32° F. Simultaneously at point 19, 31.44 KCal is provided at 145° F. to the area being heated. Next, the hydrated absorber is externally heated from 145° F. to 290° F. to raise it from point 19 to point 25 in FIG. 1, which requires 4.6 KCal sensible heat addition. This is followed by addition of 32.41 KCal to desorb water for a total of 37.03 KCal per gram mole. During this desorption, 21.05 KCal heat of condensation plus 1.07 KCal sensible heat from cooling water vapor from 290° F. to 145° F., or 22.1 KCal per gram mole is liberated for heating purposes at point 27 by the original vaporizer. The dehydrated absorber is subsequently placed in a heat exchange relationship with the area being warmed and returns 3.13 KCal sensible heat on cooling from 290° F. to 145° F. Finally, the vaporizer container is cooled by heat exchange with a 32° F. external environment and the cycle is complete. The overall heat supplied by the absorber and vaporizer at 145° F. or higher is 56.69 KCal per gram mole, while the total thermal energy taken from the external heater at point 25 is 37.03 KCal per gram mole. This results in a coefficient of performance of 1.53 thermal units output for each thermal input from the heater. The extra energy is supplied by the 32° F. environment cooperating with the heat pump for temperature increase.

Solar energy, as is well known, requires the storage of very large quantities of heat. The heat pump of the present invention stores more thermal energy than any known practical device for a given quantity of material and delivers this energy, on demand, even after the storage temperature has fallen. Furthermore, the storage is capable of lasting indefinitely so that, for example, heat can be accumulated over a period of several days and later supplied over a period of several days, as is required in some instances for a truly effective solar energy system for space heating.

Referring again to FIG. 1, the use of this heat pump for energy storage is best understood through a reexamination of the simultaneous operation of the system at points 21 and 23. During this operation, 32.41 KCal is supplied at 225° F. at point 21 while 21.04 KCal is dissipated at an ambient temperature of 75° F. to the environment. The energy 32.41 KCal is stored in the system. To liberate this energy, the absorber is placed in a heat exchange relationship with the area to be warmed, as at point 29 of FIG. 1, while the vaporizer is exposed to heat exchange with the ambient environment at point 23, where ambient air is utilized to maintain its temperature at 75° F. On initiation, 21.04 KCal is withdrawn from the environment and the original 32.41 KCal is provided by the absorber at the higher temperature. This energy output corresponds to 349 btu per pound of total chemicals. This, of course, is an extraordinary energy storage capacity supplied by the system which makes it particularly advantageous in solar applications. Other temperatures for the vaporizer and absorber are also satisfactory, depending on the relationships of FIG. 1.

It should also be noted that this invention is not restricted to locating the vaporizer in heat exchange relationship with the external atmosphere only during this first heating stage. It is also contemplated that, for very cold outside air temperatures, the vaporizer may be located in heat exchange relationship with the ground or with air from the interior of the structure being heated. In the latter case, such air, which is normally heated by contact with the absorber, is first passed over the vaporizer. The heat exchanged into the air of the structure to be heated in this latter case is necessarily reduced by the heat of vaporization lost to the vaporizer, 21.04 KCal per mole. Thus, neglecting the gain or loss of sensible heat, the heat exchanged to the interior air of the structure to be heated is 32.41 KCal per mole heat of absorption minus 21.04 KCal heat of vaporization, which results in 11.37 KCal per mole or 122 Btu per pound of total chemicals. Although this represents a significant reduction from 349 Btu in the amount of the heat output by the absorber to the interior air, it is still higher than competitive systems. Further, passing the interior air over the vaporizer is desirable when the outside temperatures are so low that the chemical heat pump of this invention would not otherwise operate efficiently to heat the interior of the structure.

It will be recognized again that, during this heating operation, the thermal energy required to raise the vapor absorptive chemical container at point 25 of FIG. 1 to 290° F. may be supplied by solar energy.

It can be seen, therefore, from FIG. 1 that the heat pump system of the present invention is advantageous for refrigerating and heating the interior of a structure using heat pump processes, as well as for storing energy, which makes it particularly adaptable to solar energy heating and cooling. It will also be recognized that the present system is particularly applicable to any thermal energy source which is subject to cyclic variations, such as may be derived from wind or tidal energy.

It will also be seen that the system utilizes (a) selective heat exchange between the vaporizer and the structure or the ambient environment, (b) selective heat exchange between the absorber and the structure or the ambient environment, and (c) an effective means for applying solar energy or alternate source energy to the absorber. These elements of the system are provided, in the preferred embodiment, by the structural system illustrated in FIGS. 2–9 and described below.

Figure 2:
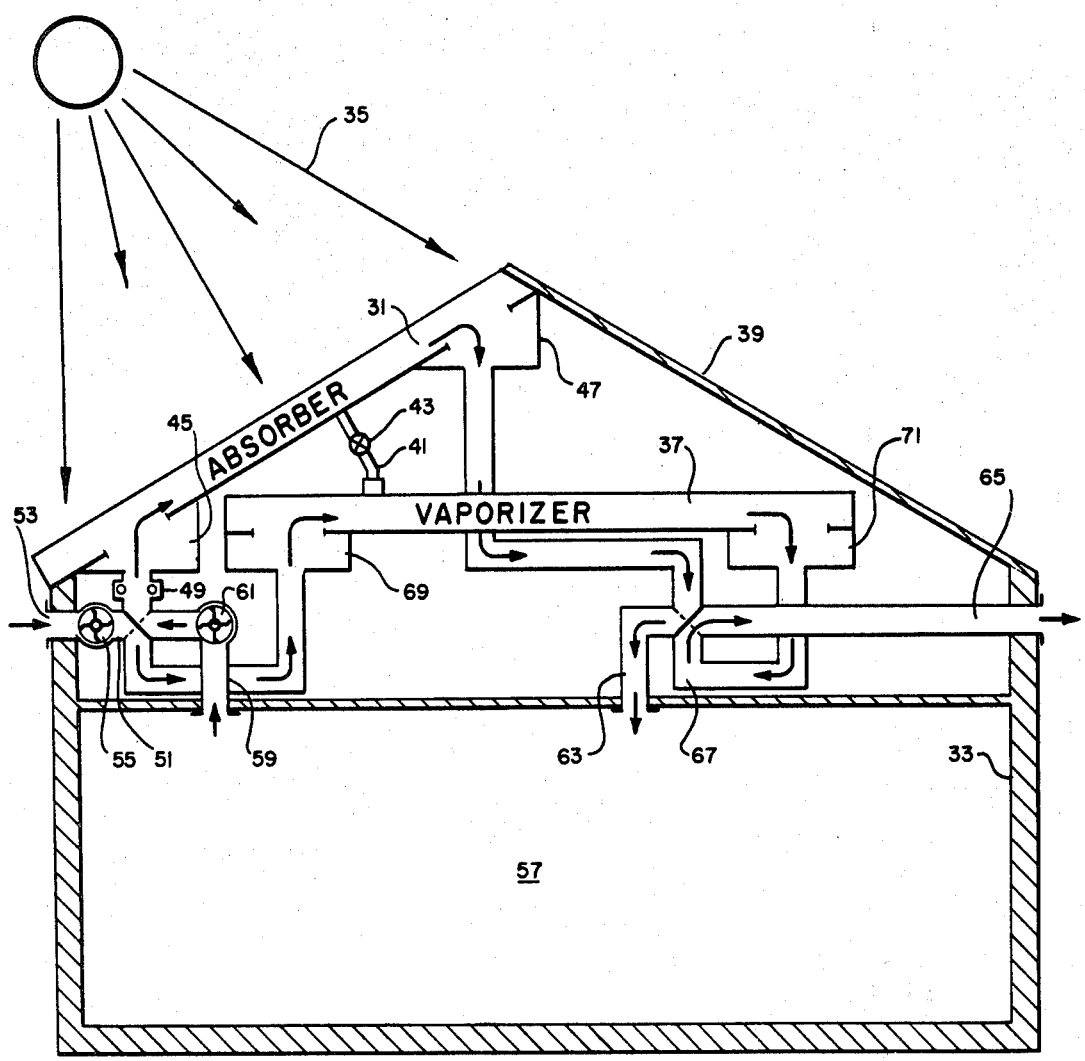
FIG. 2 is a schematic sectional view showing a residence or other structure with the chemical heat pump of the present invention installed.

Referring first to FIG. 2, the incorporation of the heat pump system of the present invention into a rooftop system, making it particularly advantageous for utilizing solar energy and for construction on existing buildings will be described. The system includes an absorber container 31 which contains a vapor absorptive chemical, the vapor pressure and temperature characteristics of which may be, for example, those defined by line 15 of FIG. 1. This container 31 is situated on the rooftop of the building or structure 33 for direct collection of solar energy 35. A second container, the vaporizer container 37, is mounted within the roof 39 of the structure 33 in the shade of the absorber container 31. The vaporizer container 37 contains a liquid to be absorbed by the chemical in the absorber container 31 and may have, for example, the vapor pressure-temperature characteristics defined by line 13 of FIG. 1. The interiors of the containers 31 and 37 are interconnected by a conduit 41 including a valve 43 for discontinuing or modulating vapor flow between these containers. It will be recognized from the previous description that vapor will flow through the conduit 41 in either direction, depending upon the operational mode of the system, to provide evaporation in the vaporizer 37 and absorption in the absorber 31, or, alternatively, to provide desorption in the absorber 31 and simultaneous condensation in the vaporizer 37.

In addition to being subjected to solar radiation 35, the absorber container 31 is subjected to a flow of heat transfer air entering the absorber 31 from a duct 45 and leaving the absorber 31 through a duct 47. The entry duct 45 is connected through an alternate energy source heater 49 (such as a natural gas heater) to a two-way valve 51. The valve 51, upon actuation, will connect the duct 45 with either ambient air from a conduit 53 forced by a blower 55 or, alternatively, with air from the interior 57 of the structure 33 drawn through a conduit 59 by a blower 61. In the solid line position of the valve 51, air from the conduit 59 enters the inlet conduit 45. In the dotted line position of the valve 51, air from the conduit 53, that is, ambient air, is blown to the inlet conduit 45. Thus, the absorber 31 may be subjected, alternately, to heat exchange with an air flow from the house 57 or the ambient environment outside of the structure 33, either flow being optionally heated, if desired, by the application of heat at the heater 49.

The outlet conduit 47 of the absorber 31 carries this heat exchange air alternately to the interior 57 of the structure 33 through conduit 63 or to the external environment through an outlet conduit 65, depending upon the position of a two-way valve 67. If the valve 67 is in the solid line position, air from the outlet conduit 47 will enter the interior 57 of the structure 33. If, on the other hand, the valve 67 is in the phantom line position, this air will be exhausted through the conduit 65 to the external atmosphere.

The valves 51 and 67 additionally control the flow of heat exchange air past the vaporizer container 37. The vaporizer 37 includes an inlet conduit 69 and an outlet conduit 71 used for manifolding heat exchange air past the vaporizer container 37. The inlet conduit 69 is alternatively connected to the interior 57 of the structure 33 or the external ambient through the conduit 53 by the valve 51, the connection being made to the ambient environment when the valve 51 is in a solid position and to the interior 57 of the structure 33 when the valve 51 is in the phantom position. In a similar manner, the valve 67 conducts the heat exchange air from the outlet conduit 71 of the vaporizer 37 to the external ambient through the conduit 65 when the valve is in its solid position or to the interior 57 of the structure 33 when the valve 67 is in its dotted line position.

Thus, a simple pair of valves 51 and 67 may be utilized to control all of the heat exchange air utilized for heating and cooling the absorber 31 and vaporizer 37. Thus, the valves 51 and 67 control the heat exchange relationships, and are adjusted for seasonal and diurnal cycles. The valves 51 and 67, in a well-known manner, may be automatically controlled in response to the temperature of the structure 33 and the ambient environment. Finally, the valve 43 can be adjusted to control the rate of vapor movement between the absorber 31 and the vaporizer 37. In particular, and again utilizing the chart of FIG. 1 in combination with the schematic diagram of FIG. 2, we may first assume that, during the daytime of summer months, the interior 57 of the structure 33 is to be refrigerated or cooled. The two-stage refrigeration process begins with the first stage, described above, by placing the vaporizer 37 at point 17 and the absorber 31 at point 19 in FIG. 1. During this phase of operation, the valves 51 and 67 are in their phantom line position, so that air from the interior 57 of the structure 33 is cooled through circulation past the 32° F. vaporizer 37 by the blower 61. At the same time, the absorber 31 is maintained in a heat exchange relationship with the outside ambient atmosphere to keep its temperature at approximately 145° F. at point 19 in FIG. 1. It will be seen from FIG. 2 that the phantom line position of the valves 51 and 67 conducts the outside ambient atmosphere from conduit 53 to the absorber 31 and returns this air to the outside conduit 65, all driven by the blower 55. Thus, the simultaneous phantom line positioning of the valves 51 and 67 permits cooling of the interior 57 of the structure 33 during the first stage of the refrigeration cycle. It will be recognized that, although solar energy 35 is being absorbed by the absorber 31 during this first phase, it is nevertheless possible, by ducting sufficient air from the outside ambient atmosphere through the ducts 45 and 47, to maintain the temperature of the absorber 31 at 145° F. as shown at point 19 in FIG. 1. It may be desirable, however, to provide a shutter or a reflective sheet to exclude solar energy 35 from striking the absorber 31 during this refrigeration phase.

When, during this first stage of refrigeration operation, sufficient water vapor has passed from the vaporizer container 37 to the absorber 31 to saturate the vapor absorptive chemical in the absorber container 31, the second stage of operation, a regeneration stage, is begun. During this operational stage, as previously described, the vaporizer 37 will be maintained at point 23 of FIG. 1 while the absorber 31 will be maintained at point 21. This is accomplished by utilizing solar energy 35 to raise the temperature of the absorber 31 to 225° F., as shown at point 21, so that the vapor pressure within the absorber 31 in this case is approximately twice the vapor pressure within the vaporizer 37 so long as the vaporizer 37 is maintained at 75°. This is accomplishe by heating the absorber 31 utilizing solar energy while the valves 51 and 67 are in their solid line position but while the blower 61 is deactivated; thus, no air is driven through the conduits 45 and 47 and the temperature in the absorber 31 is allowed to increase in response to the solar energy 35. At the same time, ambient air is drawn by the blower 55 through the duct 53 and the inlet conduit 69 to cool the vaporizer 37 so that its temperature is maintained at 75°. This air is then discarded to ambient through the conduit 65. Thus, during the regeneration or second stage of the refrigeration or air conditioning process, water vapor is desorbed from the vapor absorptive chemical in the absorber 31 and condenses in the vaporizer 37, heating the vaporizer 37, but this heat is liberated to the surrounding ambient air. Once the vapor has been removed from the vapor absorptive chemical, the first stage of the refrigeration process can again commence, cooling the interior 57 of the structure 33. It will again be recognized that, during the two phases of operation of this refrigeration cycle, an attempt has been made to maintain the vapor pressure differential at 2-to-1 in order to assure adequate vapor self-pumping within the system. It should be noted, however, that this 2-to-1 ratio is not necessary and that if, for example, the ambient temperature is above 75°, it is nevertheless possible to regenerate the system. So long as the solar energy is sufficient to raise the temperature of the absorber 31 approximately 130° above the ambient temperature, this condition is easily satisfied on most days which are sufficiently warm to require air conditioning of the structure 33.

If it is now assumed that the house is to be heated on a summer night after this refrigeration cycle has ceased, it is possible to terminate the refrigeration cycle with the vaporizer 37 at point 17. Outside ambient air may now be ducted into a heat transfer relationship with the vaporizer 37 by putting the valves 51 and 67 in the solid line position, so that the vaporizer 37 does not cool below approximately 30° F. At the same time, air from the interior 57 of the structure 33 is blown by the blower 61 past the absorber 31 which liberates heat at approximately 145° to heat the interior 57. It will be recognized, of course, that if it is possible to maintain the temperature of the vaporizer 37 above 30° F., it will be possible, in turn, to heat the structure 33 at a temperature above 145°. During this operation, the temperature of the vaporizer 37 will be maintained at some point along the line 13 between points 17 and 23, leading to an absorber temperature between the points 19 and 29 on line 15 of FIG. 1.

It will next be assumed that, during the winter, heat is to be stored during the daytime hours and liberated at night so that the heat pumps acts as a heat storage mechanism for solar energy. During the daytime hours, air is ducted from the interior 57 of the structure 33 past the absorber 31 and is returned to the interior 57. Solar energy 35 is thus permitted to heat the house directly during the daytime, while at the same time storing excess heat in the absorber chemical 31. This is accomplished by placing the vaporizer 37 in a heat exchange relationship with the external ambient air to cool the vaporizer 37, the ambient air being directed by valves 51 and 67 in their solid line position. The vaporizer 37, during this operation, is maintained at point 23 of FIG. 1. Solar energy is directly applied to heat the air ducted through the ducts 45 and 47 and thus to heat the house 57. Any excess heat is utilized to store energy within the heat pump system by desorbing water vapor from the absorber 31, which water vapor condenses in the vaporizer 37. On a winter night, when this stored heat is to be utilized, the absorber 31 is placed in a heat exchange relationship with the interior 57 by placing the valves 51 and 67 in their solid line position in FIG. 2 and operating the blower 61. At the same time, the vaporizer 37 is placed in a heat exchange relationship with the outside atmosphere by operating the blower 55, so that the vaporizer 37 is maintained at point 23 while the absorber 31 is maintained at point 29 in FIG. 1. The vaporizer 37 is maintained at point 23 through its heat exchange relationship with the outside atmosphere. It will be recognized that, under these conditions, the vaporizer 37 tends to cool, but is warmed by the ambient temperature, while the heated absorber 31 is utilized to heat the interior 57 of the structure 33. If the outside atmosphere is insufficient to maintain the vaporizer at point 23 on FIG. 1, the temperature of the vaporizer 37 will drop and the heating temperature of the absorber 31 will in turn dro, but the temperature differential between these members will nevertheless permit the interior 57 to be heated at a temperature which approaches 130° warmer than the outside temperature, sufficient on even the coldest winter day to heat the interior 57.

After an extended period of cloudy skies during which no substantial solar energy can be collected, it is also possible to utilize the present system as a heat pump in combination with the heater 49 of FIG. 2 to heat the interior 57 of the structure 33 while using less energy than would be required if the heater 49 were utilized to heat the structure directly. This is accomplished by utilizing, as in the prior modes, a two-stage, continuous process. The first stage of the process is identical with the cooling stage during refrigeration except that in this case the vaporizer is located in a heat exchange relationship with the cold external environment from which it withdraws, on vaporization, thermal energy equivalent to the heat of vaporization of the enclosed chemical. The absorber simultaneously is located in a heat exchange relationship with the space being warmed and there liberates the heat of vapor absorption at an elevated temperature. These are accomplished at points 17 and 19, respectively, in the chart of FIG. 1, the valves 51 and 67 being in the full line position of FIG. 2. In the second stage of heating, the vaporizer 37 is in a heat exchange relationship with the interior 57 of the structure 33. This is accomplished by placing the valves 51 and 67 in the dotted line position, which also places the absorber in a heat exchange relationship with ambient air pumped by the blower 55 and heated by the heater 49. The absorber is raised to point 25 in FIG. 1, causing vapors to desorb from the absorber chemical and move through the conduit 41 to the vaporizing container 37 where they condense and liberate heat at point 27 in FIG. 1, this heat being used for space heating in the structure 33. The overall result is that thermal energy is provided to the area being warmed at both stages of the chemical heat pump process, and the sum of these energies is greater than the energy supplied to the absorber 31 by the heater 49.

Figure 16:
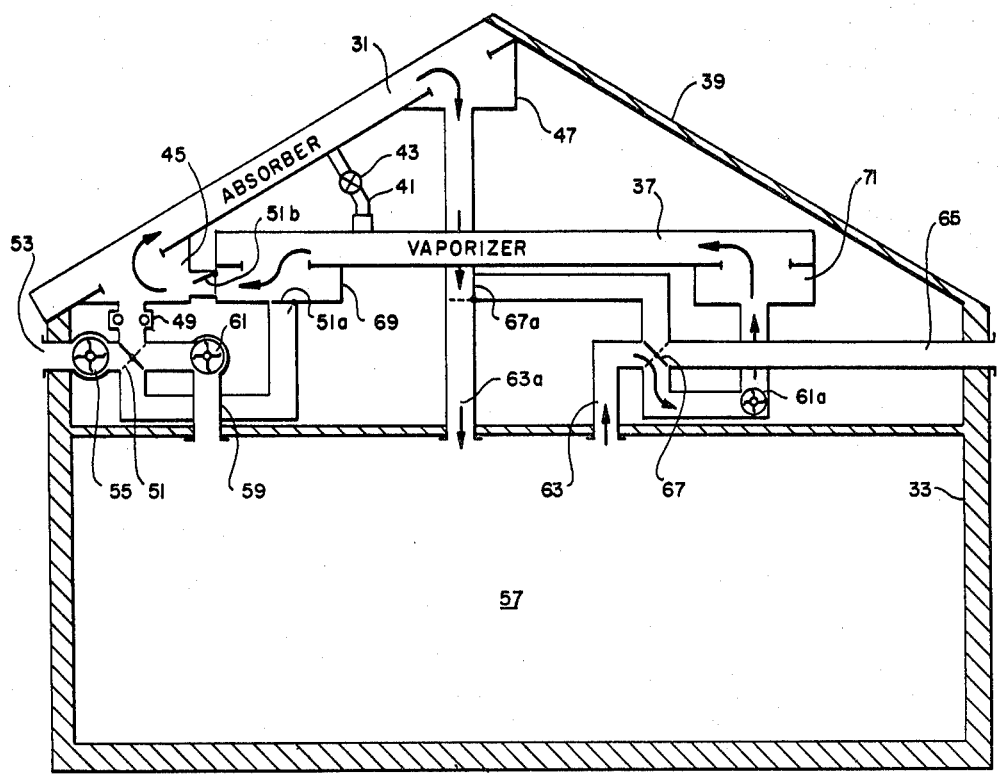
FIG. 16 is a schematic sectional view showing a residence or other structure with the chemical heat pump of the present invention installed, similar to the view of FIG. 2, while showing instead an embodiment useful for heating the structure for very low outside temperatures.

FIG. 16 illustrates an alternative arrangement of the heat pump of this invention useful for heating the interior 57 when the outside air temperature is substantially below 50 degrees Farenheit. During the above-mentioned first heating stage, when the absorber heats the interior air, it is desirable to pass air from the interior 57 through the vaporizer 37 before passing it through the absorber 31. For this purpose, a blower 61a, valves 51a, 51b, 67a, and the conduit 63a are added to the structure illustrated in FIG. 1. For normal operation, the valves 51a, 51b and 67a are disposed in their dotted line positions illustrated in FIG. 16. When the outside air temperature is very low, air from the interior 57 may be passed through the vaporizer 37 and then passed through the absorber 31 by moving the valves 51a, 51b, and 67a to their solid line positions illustrated in FIG. 16 and activating the blower 61a. The interior air will then be drawn by the blower 61a through the conduit 63, then through the blower 61a and will then pass into the vaporizer 37. The air then passes from the vaporizer 37 through the valve 51b and into the absorber 31. The absorber heats the air, after which the air is returned to the interior 57 through the valve 67a and through the conduit 63a. In this manner, the rate of evaporation in the vaporizer is maintained at a reasonable level despite very low outside temperatures. It may be desirable to supplement the heating operation with the heater 49, in which case the blower 59 may be activated to pass air heated by the heater 49 through the absorber.

Having explained the overall operation of the heat pump system and its particular advantages when used as a rooftop system where the absorber 31 is directly absorbing solar energy 35, the detailed elements of the system and, in particular, the detailed construction of the absorber 31 and vaporizer 37, will be described. These elements must be inexpensive (to keep the cost of the overall system at a minimum) while being extremely efficient, and provide the large heat transfer required for space heating in structures 33.

Figure 3:
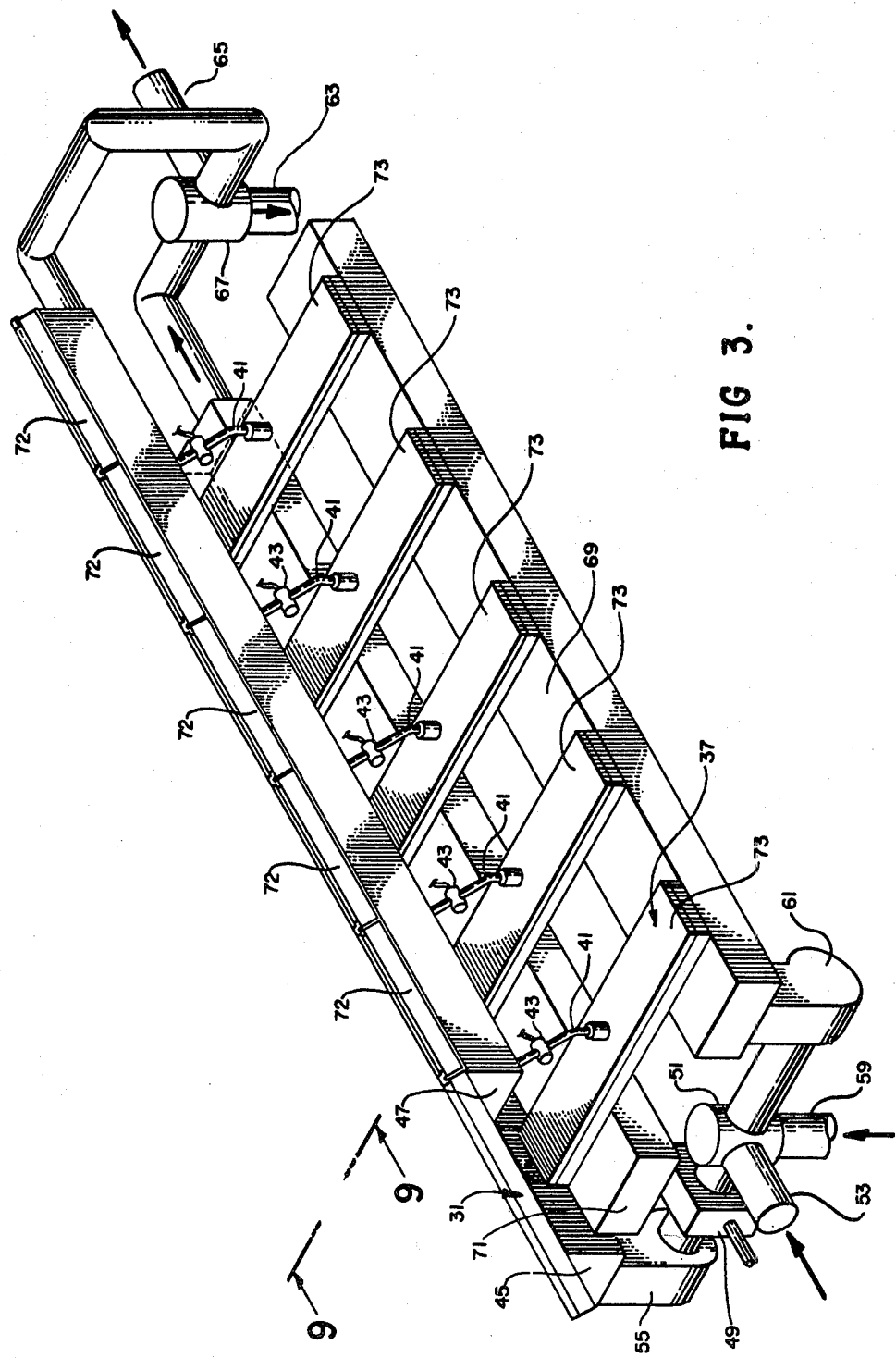
FIG. 3 is a perspective view of the heat pump system of FIG. 2 showing the duct work and valving system for controlling the operation of this system.

FIG. 3 shows a somewhat schematic illustration of the heat pump system of this invention removed from the structure 33 of FIG. 2 so that the detailed construction of the various elements and ducting between the absorber 31 and vaporizer 37 may be better understood. In actuality, the absorber 31 is comprised of plural identical absorber panels 72 and the vaporizer 37 comprises plural separate vaporizer panels 73. Each of the absorber panels 72, as previously explained, are supplied with heat transfer air by a lower duct 45, which air is removed by an upper duct 47. Similarly, each of the vaporizer panels 73 is supplied with heat transfer air from a first duct 69, which air is removed from the panels 73 by a second duct 71. The valves 51 and 67 interconnect the supply ducts 45, 71 and removal ducts 47, 69, respectively, with the ambient air ducts 53 and 65 and structure air ducts 59 and 63, all as also shown in FIG. 2. The absorber panels 72 may conveniently rest directly on the roof of the structure 73 (FIG. 2), so that the duct work as well as the vaporizer panels 73 may be placed in the attic space above the house, but protected from the elements by the structure's roof. In the preferred embodiment, vapor from each of the absorber panels 72 is interconnected only with a single vaporizer panel 37, so that multiple absorber-vaporizer pairs exists, each pair operating as an independent heat pump and each pair being interconnected by a conduit 41 and valve 43. It will be appreciated, of course, that if the structure shown in FIG. 3 is to be installed on a flat rooftop or at a location separated from the structure 33, the vaporizer panels 37 should be placed in the shade, so as not to directly absorb solar energy. For this purpose, the absorber panels 72 may be used to shade the vaporizer panels 73. It will also be recognized by those familiar with solar collectors that the absorber panels 72 should be inclined in a southerly direction if installed in the northern hemisphere and should be inclined at approximately the latitude of the installation location for most efficient solar collection throughout a normal year.

Figure 4:
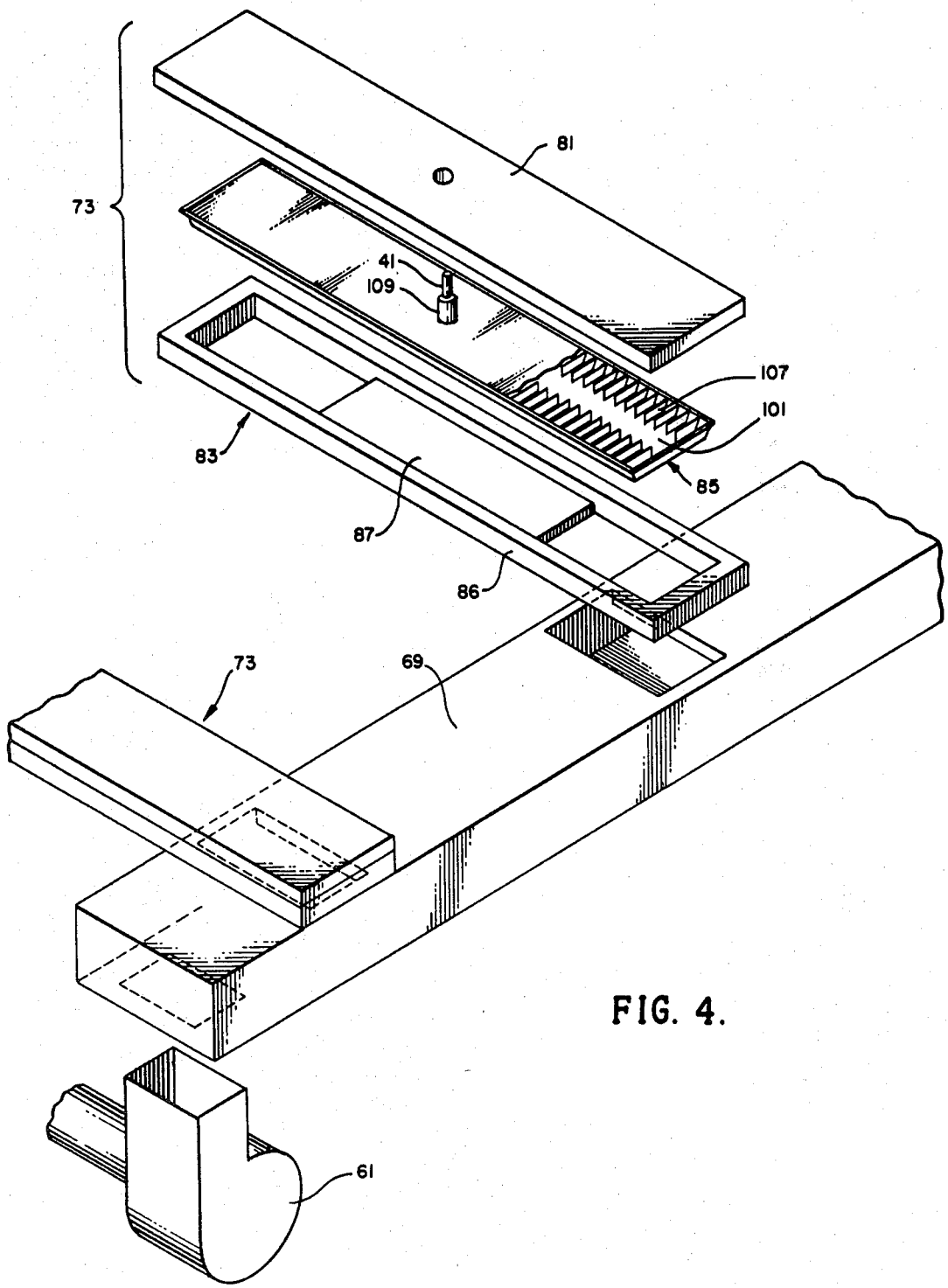
FIG. 4 is an exploded perspective view of the vaporizer containers of the present invention and their interconnection with the heat transfer duct.
Figure 5:
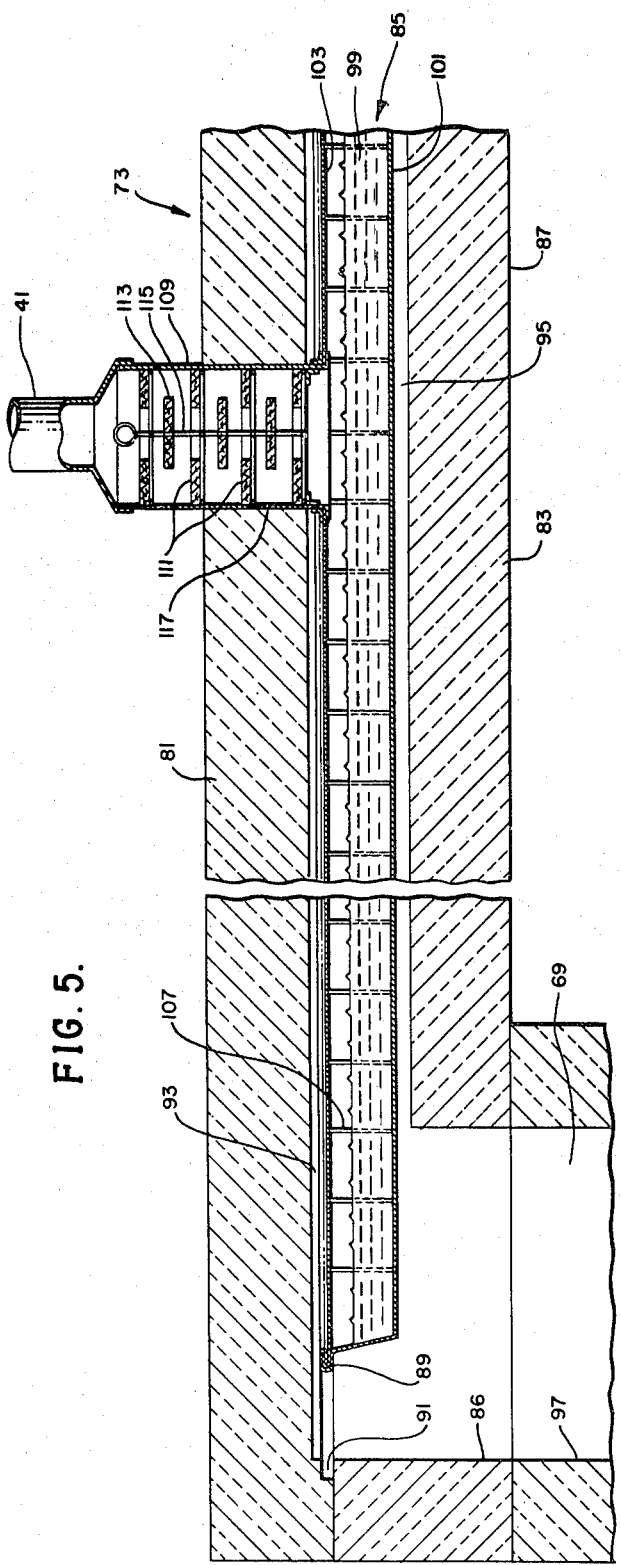
FIG. 5 is a longitudinal sectional view of the vaporizer container of FIG. 4 showing its interconnection with the heat transfer duct and the vapor droplet trap used in the vapor conduit.
Figure 6:
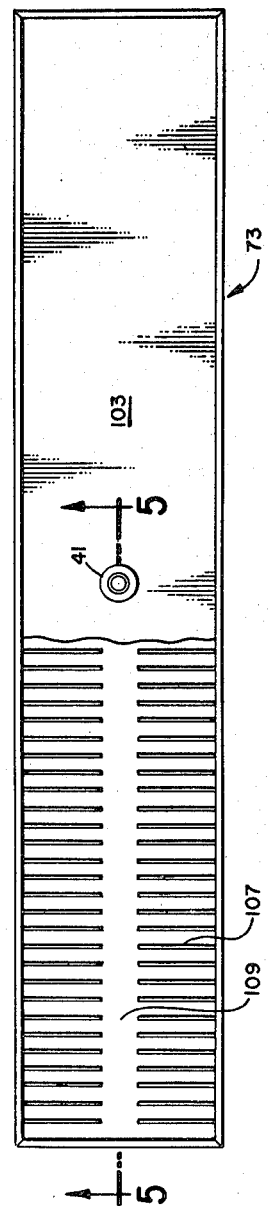
FIG. 6 is a partially broken away plan view of the evaporator container of FIGS. 4 and 5 showing the various layers of the container and its construction.

Referring now to FIGS. 4, 5 and 6, the details of construction of each of the vaporizer panels 73 will be described, as well as the method of interconnecting these panels 73 with the respective ducts 69 and 71.

The panel 73 is made up on an upper insulating layer 81, a lower insulating layer 83 and a liquid container 85. The upper insulating layer 81 may simply be a rectangular insulating foam pad, while the lower insulating layer 83 is a rectangular insulating frame 86 surrounding a thinner insulating web 87 formed integral with but spaced from the ends of the frame 85. The container 85 is supported on the insulating layers 81 and 83 and, in particular, is positioned so that a surrounding lip 89 of the container 85 seats within a recess 91 in the upper insulating layer 81 (as best seen in FIG. 5). Preferably, the lower surface of the upper insulating member 81 is recessed at 93 so that air supplied by the duct 69 can flow both above and below the container 85, the upper flow being through the recess 93 and the lower flow being through a space 95 between the thin web 87 and the lower portion of the pan 85. Thus, the pan 85 is totally suspended between the insulating layers 81 and 83 with air flow from the duct 69, which is also made from insulating material walls 97, completely enveloping the pan 85 from maximum heat transfer.

The pan 85 is a relatively thin, large, flat container being, in a preferred example, 12 inches by 65 inches in plan and 1 inch thick. A liquid to be vaporized, such as water 99, partially fills the container 85. The container 85 is preferably constructed as a very shallow flat pan having a thin metal foil bottom 101 and thin metal foil top 103 made, for example, of tin plated steel or aluminum. It will be recognized, that, for maximum efficiency, as with other evaporative refrigeration systems, a vacuum must be maintained within the container 85. The thin metal foil walls 103 and 101 will not support atmospheric pressure once the container 85 is evacuated, and for this reason plural ribs 107 of metal or plastic are positioned between the upper and lower walls 101, 103, to keep them separated when the container 85 is evacuated. As particularly shown in FIG. 6, the webs 107 may preferably be discontinuous, leaving a central manifolding portion 109 within the container 85 for supplying vapor to and from each of the interstices between the respective webs 107.

In the preferred example, the walls 101 and 103 are formed of 11-mill steel plated with tin, an extremely inexpensive, thin-walled structure being formed from this material.

To improve thermal conductivity within the vaporizer containers, the inner surfaces may be covered with capillary material, such as porous paper. This results in a heat pipe effect, with the vapors freely moving through the open space between the container walls and condensing or evaporating at the walls, while liquid is automatically distributed through the walls by capillary movements. As a consequence of these actions, the entire vaporizer approaches a constant temperature throughout its structure.

Centrally located, and in communication with the container 85, in a demisting device 109 which, in the preferred example, includes plural stacked, spaced, centrally apertured washer members 111 separated by plural stacked discs 113, all supported, for example, on a central rib 115. The diameter of the discs 113 is greater than the inside diameter of the washers 111. Vapor passing through the demisting device 109 must pass through the labyrinth formed by the members 113 and 111, which may, for example, be formed of filter paper. This labyrinth tends to remove any liquid droplets from the vapor so that the vapor reaching the conduit 41 after evaporation in the container 85 will be free of liquid droplets. It has been found that liquid droplets deteriorate the vapor absorbant chemical in the absorber trays 72, and the demister 109 is therefore helpful in assuring that only pure water vapor reaches the vapor absorbant chemical. The entire demister 109 is housed within a cylindrical cavity 117 which passes through the upper insulating pad 81 and upper wall 103, and is connected to an enlarged end 119 of the vapor conduit 41.

It will be understood that the remaining duct 71 interconnects with the other end of the panel 73 in a manner similar to that shown for the duct 69 in FIG. 5, so that high volume air flow surrounding the entire container 85 is permitted by the ducting at each end. Heat can, therefore, be very efficiently transferred from the container 85 through its thin metal walls 101,103 into the air flow in the thin passages 93 and 95 to form an effective heat transfer between the air from the duct 69 and the water 99 within the container 85.

An alternative embodiment of the vaporizer container is illustrated in FIG. 14. The unit shown in FIG. 14 consists of four glass tubes 600, preferably in the form of fluorescent light tubes. Surrounding the tubes is a manifold 610, preferably formed from an inexpensive light plastic material which forms an air space 620 between the tube 600 and the manifold 610. The interior portion 630 of each tube 600 is terminated in another manifold 640 having vapor conduit 660 attached to the manifold 640. Each air manifold 610 is terminated in the manifolds 670 and 1000. In this embodiment of the vaporizer container, the tubes 600, as best shown in FIG. 15, contain the water or ice to the vaporized or sublimated for transfer into the absorber panel through the vapor conduit 660. Heat exchange is accomplished through air which moves through the manifold formed by the structure 670 and through the air passage 620, where the air contacts the surface of the glass tube 600 and transfers heat from or to the water inside the tube interior 630 through a capillary material 1001. Because the liquid in the vaporizer vaporizes or condenses spontaneously, and the speed of such a process affects the total operation of the chemical heat pump, it is advantageous to attach a capillary material to its interior wall. The capillary material causes liquid which otherwise would accumulate at the bottom of the tube during vaporization, to become distributed over the entire surface of the tube, thereby increasing the efficiency with which the heat exchange is effected. Likewise in vapor condensation, the liquid does not accumulate in droplets, but distributes itself as a film, as well as a puddle in the bottom, which has improved thermal conductivity. I have found that glass cloth, denoted as 1001 in FIG. 15, is an excellent capillary material. One means of attaching the cloth 1001 to the interior of the tube 600 is a silicon resin used as an adhesive. Another method of attaching the cloth 1001 to the tube 600 is to place a polypropylene screen against the interior surface 1002 of the cloth 1001. Because the absorber contains magnesium chloride, the vapor which cycles in and out of the absorber may, at times, contain enough hydrogen chloride to form aqueous hydrochloric acid in the vaporizer in sufficient concentration to etch materials subject to attack by hydrochloric acid. Use of the neon or fluorescent light glass tubes of this embodiment eliminates this problem since glass is impervious to etching by hydrochloric acid. Furthermore, such tubes may be obtained cheaply, thereby reducing costs in fabricating the vaporizer container. Furthermore, such tubes are often operated with a reduced pressure in the interior and, in any case, do not require structural support for the glass. Thus, the support ribs 107, illustrated in FIGS. 5 and 6, may be eliminated and are not necessary in this alternate embodiment of the vaporizer container, further reducing cost of fabricating the vaporizer container of this alternative embodiment. From the illustration in FIG. 15, it is seen that the water in liquid form is intended to rest on the bottom of the tube 600. Therefore, the vaporizer container in FIG. 14 is preferably oriented such that the tubes have their axis of symmetry disposed horizontally level. It is important to note that the air manifold 670 is connected to the heat exchange air control system in the same manner that the passage 69 of the vaporizer container in FIG. 5 is connected. Also, the conduit 660 is connected to the absorber panel in the same way that the passage 41 of the vaporizer container illustrated in FIG. 5 is connected to the absorber panel.

Figure 9:
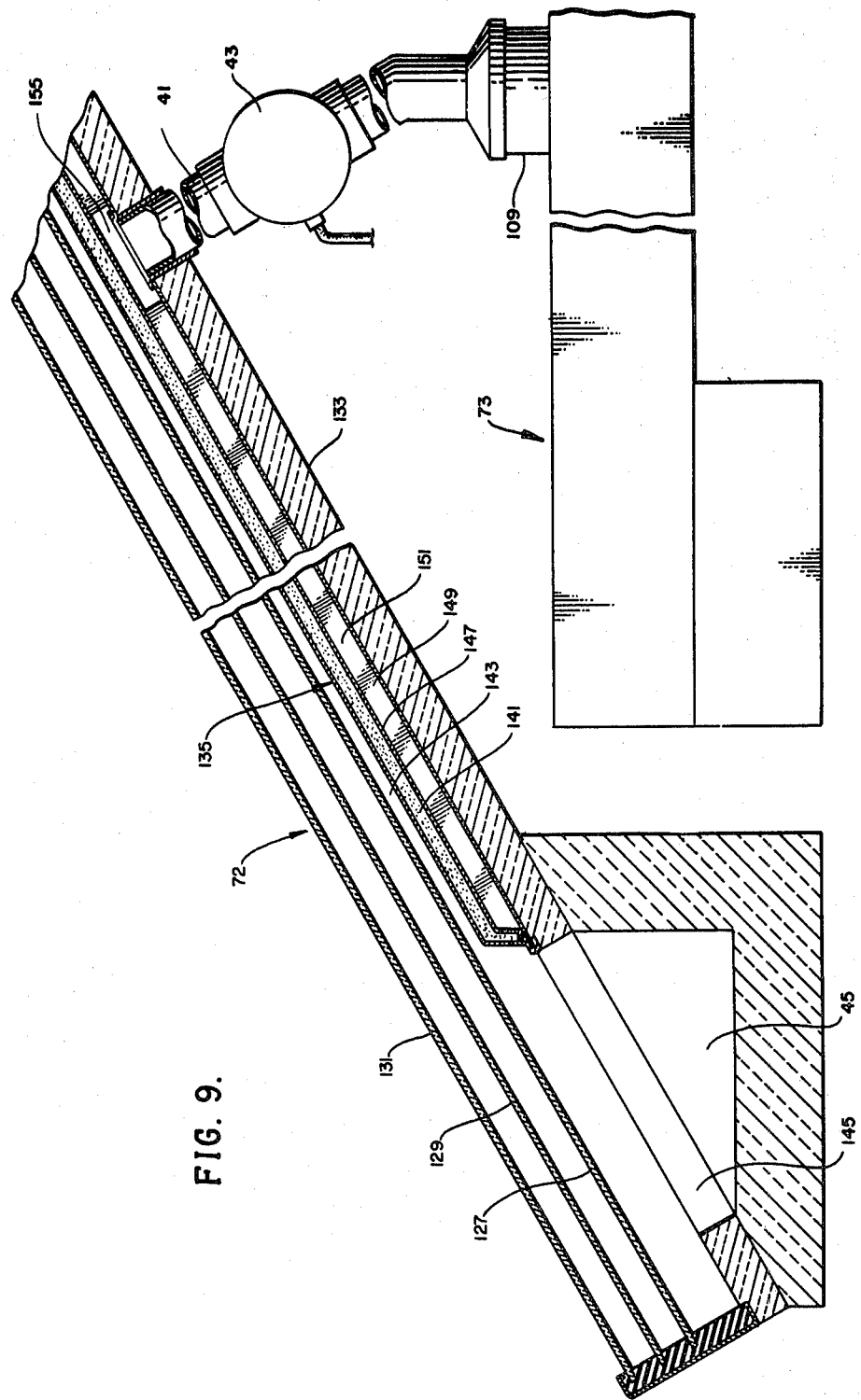
FIG. 9 is a sectional view taken along lines 9—9 of FIG. 3 at right angles to the sectional view of FIG. 7 showing the interconnection of the vapor absorptive chemical tray to the heat transfer duct of the system.

Turning now to FIGS. 7, 8 and 9, the details of construction of the absorber panels 72 will be described. The panels are shown mounted on plural T-channels 121 which may, for example, be supported on the roof of the structure 33 (FIG. 2). These T-channels 21 in turn support metal brackets 123 which form lower supports for a pair of resilient support frames 125 formed, for example, of an insulating polymer material. These support frames 125 are used to support plural transparent covers 127, 129 and 131. The covers 127-131 may be, for example, glass sheets which are used in the manner typically employed in flat plate collectors to allow the absorption of solar energy while protecting the system from excess reradiation or convection of absorbed energy.

The channels 121 additionally support a lower insulating cover 133 which form a lower support for a vapor absorptive chemical container 135. The container 135 is preferrably formed as a shallow pan similar to the pan 85 used for the vaporizer container 85. In the illustrative example, described above, the pan 135 typically has dimensions of 36 inches by 84 inches in plan and a thickness of ½ inch. The pan 135 preferably includes a flat lower wall 137 resting on the insulating pad 133 and a corrugated upper wall 139 spaced from the lowest glass plate 127. The corrugated upper surface 139 increases the surface area for heat conduction from an enclosed chemical 141 such as a magnesium chloride hydrate to the air space 141 separating the top panel 135 from the glass layer 127. The air space 141 is extremely important since it forms the flow channel for air entering the absorber panel 72 from the duct 45 and interconnects the duct 45 to the duct 47 (FIG. 2). As shown in FIG. 9, the duct 45 is insulated, as is the duct 47. The pan 135 preferably is shorter than the insulating lower cover 133 so that it can form an opening 145 for communication with air space 143. Thus, the conduit 45 freely communicates with the entire end of the air space 143 and a low velocity, low eddy flow of air is pumped from the duct 45 through the air space 143. This flow is less efficient than a turbulant flow in exchanging heat between the air flow and the vapor absorptive chemical 141, but the available surface area is so great that this is no detriment. It has been found to be extremely effective in lowering convection losses between the container 135 and the ambient atmosphere above the glass plate 131, and is an important feature of the disclosure.

The container 135 is evacuated, as was the container 85, and is thus subjected to atmospheric pressure outside of the container. In this instance, the chemical 141 is held against the corrugated upper wall 135 by a corrugated or zig-zag shaped, vapor permeable partition 147 conforming to the corrugations or zig-zags in the upper wall 139. This forms a zig-zagged layer, as shown in FIG. 7, of absorptive chemical 141, greatly increasing not only the surface area for heat transfer but also the surface area for vapor transfer between the chemical 141 and the vapor space 149 between the partition 147 and lower wall 137. In some cases, the zig-zag structure is not needed. This vapor space 149 communicates with the vapor conduit 41 (FIG. 9). In this regard, plural partitions 151 and 153 used for supporting, respectively, the upper and lower ridges of the zig-zagged partition 147, terminate short of the center of the panel 72, as shown in FIG. 9, to form a central manifold 155 for conducting vapor to the vapor conduit 41.

The vapor absorptive chemical container 135 is thus available for direct heat exchange with the air flowing in the space 143 and is available for vapor transfer through the vapor permeable partition 147. This partition 147 may conveniently be formed, for example, from filter paper folded in a corrugated fashion. The lower wall 137 of the absorber container 135 is typically constructed from light gauge steel or aluminum, while the upper wall 139 is made of extremely thin sheet metal or foil material, such as 3 mill aluminum, which is tightly pressed against the absorbant chemical 141. This assures that, as the absorbant chemical 141 expands and contracts during vapor absorption and desorption, respectively, the wall 139 moves with the surface of the chemical 141, so that voids are not formed between these layers which would interfere with efficient heat transfer. Thus, the partitions 151 and 153 support the upper wall 135 by forcing the chemical 141 against the wall 135, rather than independently supporting the wall 135, so that voids are eliminated during repeated usage cycles.

Figure 10:
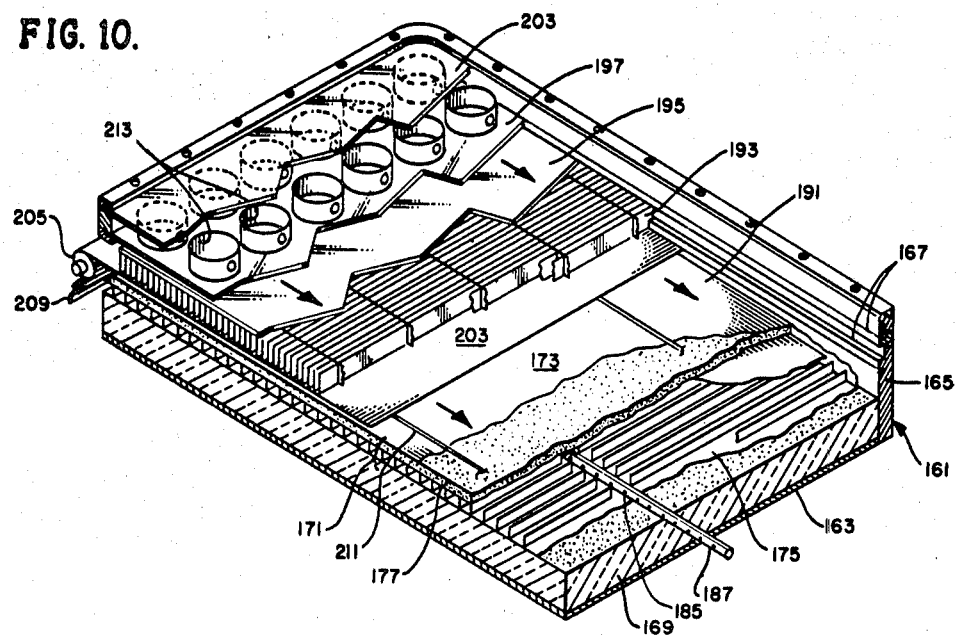
FIG. 10 is a perspective view, partially broken away, of an alternate embodiment absorber panel for use with the present invention, the absorber panel of this embodiment forming a more efficient solar collector.
Figure 11:
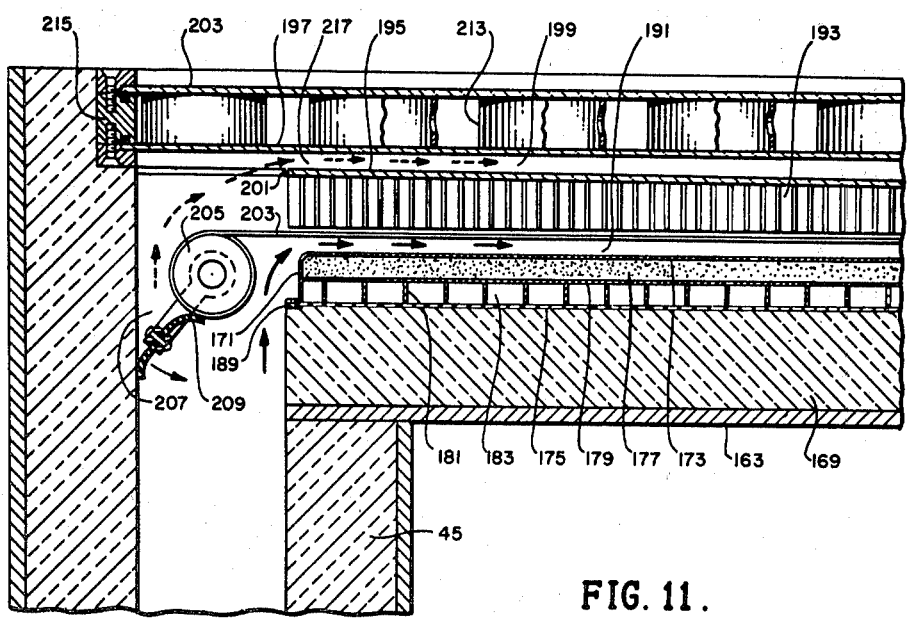
FIG. 11 is a sectional view of the solar collector of FIG. 10 showing certain structural details thereof.

While the absorber 31, shown in FIGS. 2, 3, 7, 8, and 9 is satisfactory for some purposes, the collector design shown in FIGS. 10 and 11 has been found to be a much more efficient solar collector, primarily since its ability to retain heat once collecte is greatly enhanced. It should be understood that the solar collector of FIGS. 10 and 11 is designed for mounting on the rooftop of the structure 33 in FIG. 2 in place of the absorber 31. Like the absorber panels 72 of the absorber 31 shown in FIG. 3 the absorber of FIGS. 10 and 11 will, in many instances take the form of multiple absorber panels each independently connected to a vaporizer 37. It will also be understood from the following description that the solar collector of FIGS. 10 and 11 is designed for connection between the air ducts 45 and 47 of FIG. 3 and for connection to a vapor conduit 41 in a manner identical to that described for the absorber panel 72.

The improved solar collection panel includes an outer frame 161 providing a flat, lower wall 163 and surrounding side walls 165, the side walls 165 serving to support the various layers of the collector by means of plural grooves 167. It will be understood, of course, that any convenient mounting hardware may be utilized to support the various layers of the collector, one above the other, in the manner to be described below. The grooves 167 have been found convenient for this purpose, however, and it will be understood that in those instances where certain layers of the apparatus are to be evacuated, the walls of these layers will be sealed within the groove 167.

An insulating layer 169 rests against the flat, bottom wall 163 to insulate the remaining portions of the solar collector from the roof 39 (FIG. 2) of the supporting structure. Seated directly on top of the insulating layer 169 is the vaporizer container 171 which includes upper and lower thin foil walls 173 and 175, respectively, sealed together at their perimeters and enclosing a layer of vapor absorptive chemical 177 situated adjacent the upper foil wall 173. The upper surface of the wall 173 is coated with material that imparts high solar radiant energy absorption and low infrared emissions, typically a ratio of about 4. Such coatings are presently available. The vapor absorptive chemical 177 is supported by a vapor permeable wall such as a filter paper wall 179 which is, in turn, supported by plural ribs 181 in a manner similar to that described previously. The ribs 181 are intended to support the vapor absorptive chemical 177 even though the container 171 is evacuated, thus leaving a vapor manifolding space 183 between the ribs 181. As in the absorber described previously, the ribs 181 are separated to form a manifolding channel 185, as shown in FIG. 10, and this manifolding channel may be used to support a vapor tube 187 which is connected, in turn (in a manner not shown in FIGS. 10 and 11), to the vapor conduit 41. The tube 187 may conveniently be perforated in alignment with the openings between adjacent ribs 181 to equalize the flow of vapor throughout the collector mechanism.

As in the previous embodiment, the container 171 is sealed and evacuated and thus the upper wall 173 and lower wall 175 are crimped together at 189 to form a closed vapor system.

In the prior embodiment air from the house or the ambient was drawn directly over the absorptive chemical container during both daytime and nighttime use. In the embodiment of FIGS. 10 and 11, however, it has been found that, because of the extremely high temperatures which can be expected during the daytime at the upper wall 173 of the container 171, it is virtually impossible to maintain eddy-free flow in the space 191 of the container 171. Such eddy currents induce turbulence in the flow which can substantially increase the thermal loss from the container 171 to ambient. For that reason, the embodiment shown in FIGS. 10 and 11, although it conducts nighttime air to the space 191, does not utilize this space for the passage of daytime air for solar heating of the structure, but rather uses an alternative flow passage which will be described below.

In addition to bypassing daytime air flow around the channel 191, a cellular or honeycomb structure 193 is placed in the air space 191. It has been found that this cellular structure 193 can be used to avoid strong eddy currents, and thus losses due to eddy currents can be substantially reduced. The honeycomb structure 193 is preferably constructed of transparent or reflective sheets arranged perpendicular to the absorber surface so that sunlight reflected from the surfaces continues toward the absorber. The sheets are advantageously very thin to minimize the conduction of heat by the sheets themselves. Reflective coatings appear to be attractive because reflecting surfaces have low emissivities in the infrared range whereas materials transparent to sunlight tend to introduce large thermal radiation losses.

To illustrate the spacing requirements for a cellular construction, it has been found that where the tilt of the overall roof and its solar collector is 45 degrees, where the wall 173 of the container 171 is solar heated at a temperature of 300° F., and where the first transparent collector plate 195 is at 100° F., a spacing of 0.33 inches is required for the honeycomb structure 193 in order to eliminate strong eddy currents. During such daytime conditions, even though no forced flow exists in the channel 191, the honeycomb panel 193 greatly reduces the convection losses from the system and thus enables the system to maintain high solar absorption temperatures.

The air space 191 is enclosed by the first collector cover 195, typically formed of glass or other transparent material. This cover 195 may be used to support the honeycomb structure 193 which is attached thereto, as by adhesive.

The cover 195 and the next adjacent cover 197, which is also formed of transparent material such as glass, together form a daytime air flow channel 199. This channel 199 is open to the duct 45 (since the glass 195 includes an opening 201 above the duct 45). It will be understood, in addition, that the glass cover 195 includes a similar opening at the other end of the solar collector for communication with the duct 47.

In order to reduce thermal radiation losses to the clear night sky during nighttime operation of the collector of FIGS. 10 and 11, or during operation of the system in the cooling mode, a reflective sheet 203 is designed to be selectively placed between the upper wall 173 of the container 171 and the lower side of the honeycomb partition 193. This reflective sheet 203 may be conveniently stored during daytime operation on a roller 205 which is rotationally spring biased in the same manner as is used for common night shades in houses. A valving mechanism 207 rotates about the same axis as does the sheet roller 205 and includes a flexible sealing member 209 which seals along one edge against the inlet conduit 45 and along its opposite edge against the roller 205. In the position shown in FIG. 11, the valve mechanism 207 forces air which enters the system from the conduit 45 to pass through the space 191 exclusively. This position is utilized for nighttime operation, and it will be noted that at night the sheet 203 forms the upper wall of the air flow passage 191. The sheet 203 fits into grooves in the sides 165 of the overall container and thus seals this air flow passage so that the honeycomb structure 193 does not impede normal air flow. The sheet 203 also permits a relatively thin air flow passage during nighttime operation, while at the same time permitting the air space 191 to be relatively wide to accommodate the honeycomb baffles 193 during daytime operation. Plural cords 211 may be used to selectively draw the sheet 203 between the elements 173 and 193 at dusk for nighttime use.

It has also been found that convection losses may be kept low by reducing the pressure between the second transparent cover 197 and a final third transparent cover 203. The cover 203 is formed of transparent material, such as glass, as were the covers 197 and 195. The space between the covers 197 and 203, however, is advantageously partially evacuated in order to reduce convection losses. The forces which are generated by the atmosphere once this space has been evacuated may be supported by plural, short, cylindrical spacers 213, each formed of thin wall material, such as metal sheet, and each being made reflective so as not to interfere with the absorption of sunlight by the container 171. One wall of each of the cylinders 213 is advantageously apertured to assure that no pressure differential exists across the cylindrical walls. It has been found that by using these cylinders 213, the pressure within the space between the covers 197 and 203 can be reduced to a level below 245 torr to substantially suppress free eddy formation within this air space and thus reduce the convection losses.

In order to maintain the vacuum between the covers 197 and 203, a sealing member 215 is inserted in a groove in the side wall 165 to seal the perimeters of these covers 197,203.

During daytime use of the solar collector of FIG. 10 and 11, the valve structure 207 is rotated to force air pumped into the system to flow along the dotted line path between the covers 195 and 197. It has been found that sufficient heat will flow from the absorptive chemical container 171 to this air space to heat the air for winter daytime space heating purposes. At the same time, the air flow through this air space can be maintained relatively free of eddies, since one wall is not so hot as to form eddy currents (as would be the case if the air was passed through the space 191). This air flow through this air space during daytime usage substantially reduces the convection losses during the daytime to the atmosphere. In order to maintain laminar flow characteristics, the Rayleigh number must be kept below its critical value along the flow path. Since the Rayleigh number changes as the air is heated, it has been found advantageous to make the air space 217 between the covers 195 and 197 taper so that, in a typical example, at the inlet adjacent the conduit 45, this air space may have a thickness of 0.21 inches, whereas at the outlet adjacent the conduit 47, the thickness may be 0.44 inches. The passage 217 is thus maintained as thin as possible to permit substantial heating of the air passing through the system during winter daytime usage, but is nevertheless maintained wide enough to assure low eddy flow at each location. This requires the tapering of the flow channel 217 for most effective operation.

The solar collector of FIGS. 10 and 11 substantially increases the efficiency of the overall solar system by reducing daytime convection and nighttime radiation losses from the system through the use of the honeycomb structure 193, the sheet 203, and the pair of air flow passages 191 and 217 for alternate daytime and nighttime use. The evacuated air space utilizing the supports 213 between the flat plates 197 and 203 further reduces convection losses. The overall effect of these loss reduction features is to make the system operate more satisfactorily for year-around heating and cooling purposes.

It will be understood that the wall 173 of the container 171 and the partition 179 may each be corrugated as was shown in the embodiment of FIG. 7 to increase the surface area available for heat transfer and solar radiation absorption. It will also be understood that the upper surface of the wall 173 may be blackened or otherwise treated to inhance its solar absorption qualities. In this embodiment, as with the previous embodiment, the wall 179 of the container 171 is maintained thin enough to follow the contraction and expansion of the chemical 177 during desorption and absorption of vapors, so that spaces are not formed between the chemical 177 and the wall 173 which would inhibit heat transfer.

FIGS. 12 and 13 illustrate an improved version of the alternative embodiment of the absorber panel illustrated in FIG. 10. This improved version in an absorber for a chemical heat pump system with features that offer excellent performance with a relatively simple geometry. An absorbent chemical 480 is held in a tray 490 over which is placed a solar absorbing vapor permeable screen 470 forming the vapor manifolding space 550 with a glass panel 430. The glass panel 430 and the tray 490 form an evacuated container. A glass panel 420 forms a passage 450 for daytime air with the lower glass panel 430. The container 490 forms a nighttime air passage 500 with the surface 510 of an underlying insulator 520. A top glass panel 410 forms a space 440 for inert air with the lower glass panel 420. The improved embodiment also incorporates a valve 530 moved about a hinge 540 for controlling the passage of daytime and nighttime air.

The vapor permeable wall 470 is disposed on the sunlit side of the chemical absorber 480. In the embodiment illustrated in FIG. 12, the vapor permeable wall 470 takes the form of glass cloth. This glass cloth also serves the additional purpose of acting as a solar absorber.

The glass cloth is preferably coated with a coating which readily absorbs solar radiation and has a low emissivity for infrared radiation. Such coatings are well known in the art. Also, the screen may preferably be coated with coatings which have high absorption to substantially all solar radiation and low emissivity to infrared radiation. Thus, the surface of the panel 173 of FIG. 11 is eliminated in the improved embodiment illustrated in FIG. 12 since this function is now combined with the vapor permeable screen 470 in FIG. 12 in the improved embodiment.

In the embodiment illustrated in FIG. 11, the vapor manifolding space 183, held at a pressure below atmospheric pressure, was located on the shaded side of the chemical container. In the improved embodiment, illustrated in FIG. 12, the corresponding vapor manifolding space 550 is located on the sunlit side of the chemical absorber 480. This eliminates the need for the additional evacuated chamber of the previous embodiment defined by the panels 203 and 197 in FIG. 11. Thus, the partially evacuated vapor manifolding space 550 of the improved embodiment serves a dual purpose of conducting vapor to and from the absorber chemical 480 and as a heat insulator between the chemical absorber 480 and the atmosphere. It further serves to insulate the air passing through the passage 450 from the heat stored in the absorber chemical 480. The embodiment illustrated in FIG. 11 uses a honeycomb structure 193 to cut heat losses due to convection caused by the high temperature of the absorber chemical. The honeycomb structure is not necessary in the improved embodiment, illustrated in FIG. 12, because the vapor manifolding space 550 serves to insulate the air passage 450 from the absorber chemical 480. Thus, the improvement illustrated in FIGS. 12 and 13 has resulted in the elimination of several expensive parts including the evacuated chamber of the previous embodiment, illustrated in FIG. 11 between the panels 203 and 197, the cylindrical structural supports 213, necessary to support the panels 197 and 203 against atmospheric pressure, and the honeycomb structure, illustrated in FIG. 11 at 193. Also, the function of the vapor permeable wall and solar absorber have been combined into one member, namely the vapor permeable solar absorbing screen 470 of FIG. 12.

The vapor distribution features of this improved embodiment are best illustrated in FIG. 13 and consist of a conduit 560 having holes 570 disposed within the vapor manifolding space 550. Plural partitions 555 ensure uniform distribution of vapor within the vapor manifolding space 550. The improved version of the absorber panel illustrated in FIGS. 12 and 13 represents a cost savings in the fabrication of absorber panels because of the parts eliminated in this improved embodiment as enumerated above.

The functional operation of the improved version of the absorber panel, illustrated in FIGS. 12 and 13, is virtually identical with the functional operation of the alternative embodiment absorber panel, illustrated in FIGS. 10 and 11. Vapor from a vaporizer container passes into the vapor conduit 560 and is distributed to holes 570 and guided by partitions 555 to be uniformly absorbed by the chemical 480. The dashed line position of the valve 530 illustrates the daytime operating mode of the absorber panel of FIG. 12. Heat exchange air is forced through the passage 455 into the daytime air passage 450 where the air is insulated effectively by the vapor manifold channel 550 from the absorbent chemical 480. Eddy currents are thus reduced, thereby cutting convection losses due to the heating of the daytime air in the passage 450. For nighttime operation, the valve 530 is rotated to the solid line position, illustrated in FIG. 12, and a screen 580 may be drawn from a spool 590 and disposed over the absorber chemical 480. The screen 580 serves to reduce heat losses due to emission radiation from the absorber chemical container 480. In the nighttime operation, the heat exchange air is passed through the nighttime air passage 500 directly below the absorbent chemical container 480.

In summary, the upper panel 410 of the absorber container is transparent in order to permit solar radiation to fall directly on the absorber chemical 480. The evacuated space 550 between the glass 430 and the bed of absorber chemicals 480 permits the flow of water vapor to all parts of the chemical bed and also provides good thermal insulation reducing convective heat losses from the absorber. The low pressure and low flow velocity in the space 450 lead to a layer of laminar flow without the formation of eddies in the air flow. It provides very effective insulation without the need for a closely spaced honeycomb structure. A combination of the glass plate 430 as part of the absorber structure also reduces the number of additional cover plates required and simplifies the overall collector design. The space 450 next to the vapor manifold passage 550 is used as an air passage during the day. Preferably, air enters from the house at 70° F. and is warmed to 100° F. before returning to the house to be heated. Conditions are selected so that the air flow is laminar within the space 450 and with minimum eddies and so that the net heating to the housing is 1000 BTU per day for each square foot of collector area on the absorbing screen 470. This is done by properly choosing the air flow rate, the dimensions of the air passage 450, and the thickness of the insulating layer formed by the vapor manifold passage 550. The top air space 440 acts as additional insulation. Eddies in the air flow would otherwise form in the space 450 and add to the heat loss. At night, an alternate air passage 515 is used on the otherwise shaded side of the absorber in order to maintain the desired heat rate for the house during conditions with a reduced absorber temperature. The passage 515 is selected for the nighttime air flow because it is immediately adjacent the absorber chemical 480, thereby maximizing the heat transfer between the air passage and the absorber chemical 480.

The overall system design shown in FIGS. 2 and 3 provides an extremely efficient heat pump system which may be used for space heating and cooling, as in structures, according to the vapor pressure-temperature chart shown in FIG. 1. The use of a low eddy air flow above the absorber container greatly reduces convection losses when solar energy is used as the source of energy for the heat pump system. In addition, the thin (corrugated) upper wall 139 (173) in the absorptive chemical container 135 (171) which allows this upper wall 139 (173) to move with the expanding and contracting chemical 141 (177) is extremely important in maintaining high efficiency operation over prolonged cyclical use.

The overall system of the present invention allows extremely simple control of a pair of valves to operate the entire system for heating and cooling the house during the various seasonal changes, and also allows operation of the alternate energy source heater 49 while increasing its effectiveness based on heat pump principles, without greatly increasing the cost of the system.

The valve 43, which controls vapor flow through the conduit 41 (FIGS. 2, 3, and 9), is an important control element in the system of the present invention. Thus, during nighttime heating of house air, the valve 43 can be adjusted to maintain the temperature of the absorber 31 at approximately 120° F. and, at the same time, maintain pressures within the system low enough to prevent formation of higher hydrates. During daytime use, the valve 43 is typically opened completely to allow efficient regeneration of the system. Between daytime and nighttime use the valve 43 may be closed when a storage of energy is to be accomplished. Thus, the control system which is utilized with this system shold be effective not only to operate the valves 51 and 67, but also to control the valve 43 for most efficient operation.

What is claimed is:

1. A solar energy chemical heat pump absorber panel comprising:

vapor absorbing chemical disposed in a bed portion of a transparent sealed container, said container at least partially evacuated for the transfer of water vapor in the remaining vapor transfer portion of said container;

a vapor permeable screen disposed within said sealed container between said vapor absorbing chemical and the source of sunlight, said screen coated with a substance having high infrared absorptivity and low infrared emissivity;

a first air passage for the flow of air transferring heat to and from said absorbing chemical, said air passage disposed between said source of sunlight and said transparent sealed container;

a second air passage disposed adjacent the shaded side of said transparent sealed container;

a removable shade for minimizing radiative heat loss from said absorbing chemical disposed between said absorbing chemical container and the outside environment;

a valve for selecting between heat transfer air flow through said first air passage and said second air passage; and means disposed within said vapor transfer portion of said transparent sealed container for providing substantially uniform distribution of water vapor over said bed portion containing said absorbing chemical.

* * * * *